US008303407B2

(12) United States Patent
Griswold et al.

(10) Patent No.: US 8,303,407 B2

(45) **Date of Patent: *Nov. 6, 2012**

(54) SINGLE SOURCE VISUAL IMAGE DISPLAY DISTRIBUTION ON A GAMING MACHINE

(75) Inventors: Chauncey W. Griswold, Reno, NV (US); Harold E. Mattice, Gardnerville, NV (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 792 days.

This patent is subject to a terminal disclaimer.

(21) Appl. No.: 12/345,515

(22) Filed: Dec. 29, 2008

(65) Prior Publication Data

US 2009/0111578 A1 Apr. 30, 2009

Related U.S. Application Data

(63) Continuation of application No. 10/982,012, filed on Nov. 5, 2004, now Pat. No. 7,488,252.

(51) Int. Cl.

| | |
|---|---|
| ***A63F 9/24*** | (2006.01) |
| ***A63F 13/00*** | (2006.01) |
| ***A63F 1/00*** | (2006.01) |
| ***G06F 17/00*** | (2006.01) |
| ***G06F 19/00*** | (2011.01) |
| ***A63B 71/00*** | (2006.01) |

(52) U.S. Cl. ................ 463/31; 463/30; 463/33; 463/34; 463/46; 273/138.1; 273/138.2; 273/139; 359/630; 359/631

(58) Field of Classification Search .............. 463/30–34, 463/46; 273/138.1, 138.2, 139, 148 B; 359/630–631
See application file for complete search history.

(56) References Cited

U.S. PATENT DOCUMENTS 3,708,219 A 1/1973 Forlini et al.

(Continued)

FOREIGN PATENT DOCUMENTS

CN 1137651 12/1996

(Continued)

OTHER PUBLICATIONS

PCT International Search Report and Written Opinion from corresponding International Application No. PCT/US2005/034046 mailed on Jan. 27, 2006, 12 pages.

(Continued)

*Primary Examiner* — David L Lewis
*Assistant Examiner* — Chase Leichliter
(74) *Attorney, Agent, or Firm* — Weaver Austin Villeneuve & Sampson LLP

(57) ABSTRACT

Systems and methods for displaying multiple visual images from a single source at a gaming machine are disclosed. A reversible display device at the gaming machine presents multiple visual images from a display cell or other core display component. Virtual curtains alternate between blocking and permitting the display of visual images at various surfaces of the reversible display device. For a display cell or similar component needing a separate illumination source, illumination components alternate on and off in coordinated fashion with the virtual curtains, and are arranged to reflect light through the display cell in one direction to display one visual image at one surface and then in an opposite direction to display another visual image at the opposite surface. Lenses, mirrors and other optical devices redirect or alter a visual image from a surface such that it is not viewed directly from the display device itself.

26 Claims, 11 Drawing Sheets

U.S. PATENT DOCUMENTS 4,333,715 A 6/1982 Brooks
4,517,558 A 5/1985 Davids
4,578,710 A * 3/1986 Hasegawa ..................... 348/782
4,607,844 A 8/1986 Fullerton et al.
4,621,814 A * 11/1986 Stepan et al. ................... 463/46
4,659,182 A 4/1987 Aizawa
4,718,672 A 1/1988 Okada
4,911,449 A 3/1990 Dickinson et al.
4,912,548 A 3/1990 Shanker et al.
5,086,354 A 2/1992 Bass et al.
5,113,272 A 5/1992 Reamey
5,132,839 A 7/1992 Travis
5,319,491 A 6/1994 Selbrede
5,342,047 A 8/1994 Heidel et al.
5,364,100 A 11/1994 Ludlow et al.
5,375,830 A 12/1994 Takemoto et al.
5,376,587 A 12/1994 Buchmann et al.
5,393,061 A 2/1995 Manship et al.
5,467,893 A 11/1995 Landis, II et al.
5,539,547 A 7/1996 Ishii et al.
5,580,055 A 12/1996 Hagiwara
5,585,821 A 12/1996 Ishikura et al.
5,589,980 A 12/1996 Bass et al.
5,745,197 A 4/1998 Leung et al.
5,752,881 A 5/1998 Inoue
5,764,317 A 6/1998 Sadovnik et al.
5,910,046 A 6/1999 Wada et al.
5,951,397 A 9/1999 Dickinson
5,956,180 A 9/1999 Bass et al.
5,967,893 A 10/1999 Lawrence et al.
5,971,271 A 10/1999 Wynn et al.
5,988,638 A 11/1999 Rodesch et al.
6,001,016 A 12/1999 Walker et al.
6,015,346 A 1/2000 Bennett
6,027,115 A 2/2000 Griswold et al.
6,050,895 A 4/2000 Luciano et al.
6,054,969 A 4/2000 Haisma
6,059,658 A 5/2000 Mangano et al.
6,086,380 A * 7/2000 Chu et al. .................. 434/307 A
6,110,043 A * 8/2000 Olsen .............................. 463/27
6,135,884 A 10/2000 Hedrick et al.
6,159,098 A 12/2000 Slomiany et al.
6,164,645 A * 12/2000 Weiss ......................... 273/138.2
6,190,255 B1 2/2001 Thomas et al.
6,213,875 B1 4/2001 Suzuki
6,234,897 B1 5/2001 Frohm et al.
6,244,596 B1 6/2001 Kondratjuk
6,251,014 B1 6/2001 Stockdale et al.
6,252,707 B1 6/2001 Kleinberger et al.
6,254,481 B1 7/2001 Jaffe
6,315,666 B1 11/2001 Mastera et al.
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,398,220 B1 6/2002 Inoue
6,416,827 B1 7/2002 Chakrapani et al.
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,511,375 B1 1/2003 Kaminkow
6,514,141 B1 2/2003 Kaminkow et al.
6,517,433 B2 2/2003 Loose et al.
6,517,437 B1 2/2003 Wells et al.
6,547,664 B2 4/2003 Saunders
6,575,541 B1 6/2003 Hedrick et al.
6,585,591 B1 7/2003 Baerlocher et al.
6,623,006 B2 * 9/2003 Weiss ......................... 273/138.2
D480,961 S 10/2003 Deadman
6,646,695 B1 11/2003 Gauselmann
6,652,378 B2 11/2003 Cannon et al.
6,659,864 B2 12/2003 McGahn et al.
6,661,425 B1 12/2003 Hiroaki
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,782,281 B1 * 8/2004 Nagasawa .................. 455/575.3
6,802,777 B2 10/2004 Seelig et al.
6,817,946 B2 11/2004 Motegi et al.
6,887,157 B2 5/2005 LeMay et al.
6,890,259 B2 5/2005 Breckner et al.
6,906,762 B1 6/2005 Witehira et al.
7,095,180 B2 8/2006 Emslie et al.
7,097,560 B2 8/2006 Okada
7,115,033 B1 10/2006 Timperley
7,159,865 B2 1/2007 Okada
7,204,753 B2 4/2007 Ozaki et al.
7,207,883 B2 4/2007 Nozaki et al.
7,309,284 B2 12/2007 Griswold et al.
7,488,252 B2 2/2009 Griswold et al.
7,841,944 B2 11/2010 Wells
8,118,670 B2 2/2012 Griswold et al.
2001/0013681 A1 8/2001 Bruzzese et al.
2001/0031658 A1 10/2001 Ozaki et al.
2002/0045472 A1 4/2002 Adams
2002/0151360 A1 * 10/2002 Durham et al. ................. 463/30
2002/0173354 A1 11/2002 Winans et al.
2002/0175466 A1 11/2002 Loose et al.
2002/0183109 A1 12/2002 McGahn et al.
2003/0027624 A1 2/2003 Gilmore et al.
2003/0032478 A1 2/2003 Takahama et al.
2003/0032479 A1 2/2003 LeMay et al.
2003/0069060 A1 4/2003 Seelig et al.
2003/0087690 A1 5/2003 Loose et al.
2003/0130026 A1 7/2003 Breckner et al.
2003/0130028 A1 7/2003 Aida et al.
2003/0153385 A1 * 8/2003 Ikeya et al. ..................... 463/31
2003/0236114 A1 12/2003 Griswold et al.
2004/0029636 A1 2/2004 Wells
2004/0063490 A1 4/2004 Okada
2004/0066475 A1 4/2004 Searle
2004/0116178 A1 6/2004 Okada
2004/0147303 A1 7/2004 Imura et al.
2004/0150162 A1 8/2004 Okada
2004/0162146 A1 8/2004 Ooto
2004/0166925 A1 8/2004 Emori et al.
2004/0166927 A1 8/2004 Okada
2004/0171423 A1 9/2004 Silva et al.
2004/0183972 A1 9/2004 Bell
2004/0198485 A1 10/2004 Loose et al.
2004/0209671 A1 10/2004 Okada
2004/0214635 A1 10/2004 Okada
2004/0214637 A1 10/2004 Nonaka
2004/0239582 A1 12/2004 Seymour
2005/0037843 A1 2/2005 Wells et al.
2005/0062410 A1 3/2005 Bell et al.
2005/0063055 A1 3/2005 Engel
2005/0153772 A1 7/2005 Griswold et al.
2005/0153775 A1 7/2005 Griswold et al.
2005/0192090 A1 9/2005 Muir et al.
2005/0206582 A1 9/2005 Bell et al.
2006/0100014 A1 5/2006 Griswold et al.
2006/0103951 A1 5/2006 Bell et al.
2006/0125745 A1 6/2006 Evanicky
2006/0191177 A1 8/2006 Engel
2006/0284574 A1 12/2006 Emslie et al.
2006/0290594 A1 12/2006 Engel et al.
2008/0020816 A1 1/2008 Griswold et al.
2008/0064497 A1 3/2008 Griswold et al.
2008/0261674 A9 10/2008 Okada

FOREIGN PATENT DOCUMENTS

CN 1208210 2/1999
EP 0 454 423 10/1991
EP 0 484 103 5/1992
EP 0 997 857 5/2000
EP 1 000 642 5/2000
EP 1 260 928 11/2002
EP 1 282 088 2/2003
EP 1 462 152 9/2004
EP 1 492 063 12/2004
GB 1 464 896 2/1977
GB 2 239 547 A 7/1991

| | | |
|---|---|---|
| GB | 2 385 004 | 8/2003 |
| JP | H02-90884 | 7/1990 |
| JP | H03-20388 | 2/1991 |
| JP | 04-220276 | 8/1992 |
| JP | H05-68585 | 9/1993 |
| JP | 06-043425 | 2/1994 |
| JP | 07-124290 | 5/1995 |
| JP | H10-015247 | 1/1998 |
| JP | 10-234932 | 9/1998 |
| JP | 11-000441 | 1/1999 |
| JP | H11-137852 | 5/1999 |
| JP | 2000-300729 | 10/2000 |
| JP | 2000-350805 | 12/2000 |
| JP | 2000-354685 | 12/2000 |
| JP | 2001-062032 | 3/2001 |
| JP | 2001-238995 | 9/2001 |
| JP | 2001-252393 | 9/2001 |
| JP | 2001-252394 | 9/2001 |
| JP | 2002-085624 | 3/2002 |
| JP | 2004-089707 | 3/2004 |
| JP | 2004-105616 | 4/2004 |
| JP | 2004-166879 | 6/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-043425 | 2/2006 |
| JP | 2006-346226 | 12/2006 |
| RU | 2 053 559 | 1/1996 |
| RU | 2 145 116 | 1/2000 |
| RU | 29794 | 5/2003 |
| WO | WO 99/42889 | 8/1999 |
| WO | WO 99/44095 | 9/1999 |
| WO | WO 00/32286 | 6/2000 |
| WO | WO 01/15127 | 3/2001 |
| WO | WO 01/15128 | 3/2001 |
| WO | WO 01/15132 | 3/2001 |
| WO | WO 01/09664 | 8/2001 |
| WO | WO 03/039699 | 5/2003 |
| WO | WO 2004/001486 | 12/2003 |
| WO | WO 2004/079674 | 9/2004 |
| WO | WO 2004/102520 | 11/2004 |
| WO | WO 2005/071629 | 8/2005 |
| WO | WO 2005/071632 | 8/2005 |
| WO | WO 2006/034192 | 3/2006 |
| WO | WO 2006/038819 | 4/2006 |
| WO | WO 2006/052327 | 5/2006 |
| WO | WO 2007/040413 | 4/2007 |

OTHER PUBLICATIONS

Examination Report from European Application No. 05 798 637.4-2221, dated Sep. 4, 2007, 7 pages.
EP Communication in Application No. 08001740.3 dated Apr. 1, 2008.
Notice of Allowance dated Sep. 29, 2008 from U.S. Appl. No. 10/982,012.
US Office Action dated Nov. 2, 2006 issued in 10/755,657.
US Office Action dated Apr. 17, 2007 issued in 10/755,657.
US Notice of Allowance and Notice of Allowability dated Aug. 22, 2007 issued in U.S. Appl. No. 10/755,657.
US Office Action dated Mar. 30, 2010 issued in 11/938,086.
US Office Action Final dated Aug. 19, 2010 issued in 11/938,086.
US Office Action dated Dec. 3, 2010 issued in 11/938,086.
US Notice of Allowance dated Apr. 18, 2011 issued in 11/938,086.
US Notice of Allowance dated Oct. 7, 2011 issued in 11/938,086.
US Office Action dated Aug. 28, 2007 issued in 10/755,598.
US Office Action Final dated Apr. 23, 2008 issued in 10/755,598.
US Office Action dated Oct. 8, 2008 issued in 10/755,598.
US Office Action Final dated Jul. 1, 2009 issued in 10/755,598.
US Office Action Final dated Jan. 22, 2010 issued in 10/755,598.
US Office Action Final dated Aug. 4, 2010 issued in 10/755,598.
US Notice of Panel Decision from Pre-Appeal Brief Review dated Dec. 1, 2010 issued in 10/755,598.
US Office Action dated Mar. 28, 2011 issued in 10/755,598.
US Office Action Final dated Nov. 8, 2011 issued in 10/755,598.
US Office Action dated Oct. 31, 2008 issued in 11/829,917.
US Office Action Final dated Aug. 11, 2009 issued in 11/829,917.
US Office Action dated Jan. 29, 2010 issued in 11/829,917.
US Office Action Final dated Aug. 5, 2010 issued in 11/829,917.
US Office Action dated Nov. 17, 2004 issued in 10/376,852.
US Office Action dated Apr. 13, 2005 issued in 10/376,852.
US Office Action Final dated Nov. 18, 2005 issued in 10/376,852.
US Advisory Action dated Feb. 7, 2006 issued in 10/376,852.
US Office Action dated Sep. 19, 2006 issued in 10/376,852.
US Notice of Informal or Non-Responsive Amendment dated Mar. 9, 2007 issued in 10/376,852.
US Office Action Final dated Jun. 22, 2007 issued in 10/376,852.
US Office Action dated Jan. 28, 2008 issued in 10/376,852.
US Office Action Final dated Aug. 6, 2008 issued in 10/376,852.
US Office Action dated Feb. 2, 2009 issued in 10/376,852.
US Notice of Allowance dated Nov. 10, 2009 issued in 10/376,852.
US Office Action dated Mar. 25, 2010 issued in 10/376,852.
PCT International Preliminary Report on Patentability and Written Opinion dated May 8, 2007 issued in WO 2006/052327.
Mexican Office Action (as described by foreign counsel) dated Jun. 29, 2009 issued in MX07/05381.
PCT International Search Report dated Jun. 6, 2005 issued in WO 2005/071632.
PCT International Preliminary Report on Patentability and Written Opinion dated Jul. 17, 2006 issued in WO 2005/071632.
Australian Examiner's First Report dated Jun. 17, 2009 issued in AU 2005207566.
AU Examiner's Report No. 2 dated Jun. 9, 2010 issued in AU 2005207566.
Canadian Office Action dated Feb. 27, 2012 issued in CA 2,552,879.
Chinese First Office Action dated Sep. 5, 2008 issued in CN Application No. 200580002318.2.
Chinese Second Office Action dated Jun. 26, 2009 issued in CN Application No. 200580002318.2.
Chinese Third Office Action dated Nov. 6, 2009 issued in CN Application No. 200580002318.2.
European Examination Report dated Nov. 17, 2006 issued in EP 05 705 552.7.
PCT International Search Report dated May 25, 2005 issued in WO 2005/071629.
PCT International Preliminary Report on Patentability and Written Opinion dated Jul. 17, 2006 issued in WO 2005/071629.
Australian Examiner's First Report dated Nov. 12, 2009 issued in AU Application No. 2005207309.
Australian Examiner's Report No. 2 dated Sep. 15, 2010 issued in AU Application No. 2005207309.
Chinese First Office Action dated Nov. 28, 2008 issued in Application No. 2005800022940.
Chinese Second Office Action dated Sep. 25, 2009 issued in Application No. 2005800022940.
Chinese Third Office Action dated May 11, 2010 issued in Application No. 2005800022940.
European Examination Report dated Sep. 13, 2007 issued in EP 05 705 315.9-1238.
Mexican Office Action (as described by foreign counsel) dated Jun. 18, 2009 issued in MX06/07950 [197MX].
Russian Resolution on Granting Patent for Invention dated Jul. 18, 2008.
PCT International Search Report dated Jun. 15, 2004 issued in WO 2004/079674.
PCT International Preliminary Report on Patentability and Written Opinion dated Sep. 2, 2005 issued in WO 2004/079674.
Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Aprl. 10, 2007 issued in Application No. 2005-518567.

Japanese Description of Office Action (interrogation) dated May 25, 2009 issued by an Appeal Board in Application No. 2005-518567.
Bonsor, Kevin (2002), "How Smart Windows Will Work," Howstuffworks, Inc. 1998-2002, [retrieved from the Internet on Nov. 25, 2002] at http://www/howstuffworks.com/smart-window.htm/ printable, 5 pgs.
Bonser, Kevin (2004) "How Smart Windows Work," HowStuffWorks, Inc., 1998-2004, retrieved from the Internet on Apr. 1, 2004 at http://www.howstuffworks.com, 9 pgs.
Debut of the Let's Make a Deal Slot Machine (2002), The Official Let's Make a Deal Website at www.letsmakeadeal.com, 1999-2002, modified Jan. 2, 2002; downloaded from Internet on Dec. 3, 2002 at http:///www.letsmakeadeal.com/pr01.htm, 2 pgs.
Light Valve (2005), www.meko.co.uk, [retrieved from the Internet on Nov. 15, 2005] at http://www.meko.co.uk/lightvalve.shtml, 1 page.
Liquid Crystal Display (2005), Wikipedia.org, [retrieved from the Internet on Nov. 16, 2005] at http://en.wikipedia.org/wiki/LCD, 6 pgs.
"Living in a flat world?" Deep Video Imaging Ltd. Marketing Brochure, published in 2000 (full date unknown), 8 pgs.
Newton, Harry, Newton's Telecom Dictionary, Jan. 1998, Telecom Books and Flatiron Publishing, p. 399.
Novel 3-D Video Display Technology Developed, News release on Aug. 30, 1996; [Retrieved from Internet at http://www.eurekalert.org/ summaries/1199.html (archive) on Sep. 2, 2000; Feb. 14, 2003], 2 page.
Saxe et al. (1996) "Suspended-Particle Devices," Refr-spd.com, retrieved from the Internet on Apr. 1, 2004 at http://www.refr-spd.com, vol. Information Display Apr./May 1996, 5 pgs.
SPD (1999), Malvino Inc., retrieved from the Internet on Jul. 19, 1999 at http://www.malvino.com, 10 pgs.
Time Multiplexed Optical Shutter (TMOS): A revolutionary Flat Screen Display Technology, www.tralas.com/TMOS.html, Apr. 5, 2001, printed from Internet Archive using date Apr. 11, 2001; 5 pgs.
Time Multiplexed Optical Shutter (TMOS): A revolutionary Flat Screen Display Technology, www.vea.com/TMOS.html, Apr. 8, 1999, printed from Internet Archive using date Oct. 6, 1999; 6 pgs.
What is SPD? (2002), www.SPD Systems, Inc., [retrieved from the Internet on Dec. 4, 2002] at http://www.spd-systems.com/spdq.htm, 2 pgs.

* cited by examiner

SINGLE SOURCE VISUAL IMAGE DISPLAY DISTRIBUTION ON A GAMING MACHINE

CROSS-REFERENCE TO RELATED APPLICATIONS

This application is a continuation of, pursuant to the provisions of 35 U.S.C. §120, and claims the benefit of priority of allowed U.S. patent application Ser. No. 10/982,012, filed on Nov. 5, 2004, titled "SINGLE SOURCE VISUAL IMAGE DISPLAY DISTRIBUTION ON A GAMING MACHINE", which is incorporated by reference herein in its entirety and for all purposes.

TECHNICAL FIELD

The present invention relates generally to gaming machines and systems, and more specifically to the display of visual images and video on or about gaming machines and systems.

BACKGROUND

Casinos and other forms of gaming comprise a growing multi-billion dollar industry wherein floor space is at a premium, such that newer, more popular and increasingly sophisticated games and machines are preferred over older and less popular ones. For example, the casino and gaming industries have experienced a marked shift over the past few decades not only from the prevalence of table games to gaming machines, but also from the use of fully mechanical gaming machines to electronic and microprocessor based gaming machines. In a typical gaming machine, such as a video poker or slot machine, a game play is first initiated through a player wager of money or credit, whereupon the gaming machine determines a game outcome, presents the game outcome to the player and then potentially dispenses an award of some type, including a monetary award, depending on the game outcome. Although this process is generally true for both mechanical and electronic gaming machines, electronic machines tend to be more popular with players and thus more lucrative for casinos for a number of reasons, such as increased game varieties, more attractive and dynamic presentations and the ability to award larger jackpots.

Electronic and microprocessor based gaming machines can include a number of hardware and software components to provide a wide variety of game types and game playing capabilities, with such hardware and software components being generally well known in the art. A typical electronic gaming machine comprises a central processing unit ("CPU") or master gaming controller ("MGC") that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Exemplary hardware devices can include bill validators, coin acceptors, card readers, keypads, buttons, levers, touch screens, coin hoppers, ticket printers, player tracking units and the like.

In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others. Apparatuses and methods for providing displays in gaming machines and/or within a casino are generally well known, and instances of such apparatuses and methods can be found in, for example, U.S. Pat. Nos. 5,971,271; 6,135,884; 6,251,014; and 6,503,147, all of which are incorporated herein by reference in their entirety and for all purposes.

Various methods of gaining and maintaining interest in game play include designing and providing gaming machines with intriguing and different themes, game types, artwork, visual displays, sounds and the like. One attractive feature for many players is the use of three dimensional graphics or displays in a gaming machine, particularly where such displays are integrated with game play and/or other pertinent presentations to a game player. Such displays and presentations tend to be relatively dramatic, appealing and eye catching for players, prospective players and passers by alike. As in the case of many image, video and graphical displays in the electronic age, appealing yet complex three-dimensional renderings can be programmed for generation and display by many different advanced processors and accompanying devices. Preferable devices can include high resolution LCDs, as well as flat panel and plasma displays, among others, as will be readily appreciated.

Unfortunately, many forms of three-dimensional graphics or renderings and other similarly complex graphics are extremely demanding with respect to the amounts of electronic storage space, processing power and state of the art high resolution display devices required. Accordingly, many gaming machines do not provide such three-dimensional displays or other complex graphical renderings, and those that do tend to be rather expensive when compared to typical electronic gaming machines. Other issues that arise where complex displays may be required or desired for a particular gaming machine or line of gaming machines include the ability to run multiple views of one or more games simultaneously within a single gaming machine, a corresponding need or desire for multiple display devices within or about a single gaming machine, as well as increased needs for cooling and space, such as where many displays and other power consuming devices are used in one gaming machine.

While existing systems and methods for displaying visual images and/or video at gaming machine have been satisfactory, improvements are usually welcomed and encouraged. It is thus desirable that new and improved gaming machine display systems and methods have inexpensive yet appealing and innovative visual displays.

SUMMARY

It is an advantage of the present invention to provide improved systems and methods for presenting visual displays in or about a gaming machine or gaming system. This is accomplished in many embodiments by providing within or about the gaming machine or gaming system at least one "reversible" visual display device that is adapted to present multiple visual images from a single source, such as an LCD cell or other core display component. Such visual images can be repeated or "static" images and/or video streams, as will be readily appreciated. In this manner, multiple visual displays can be provided in or about a gaming machine or gaming system without requiring a separate CRT, LCD, flat panel display, plasma display or other conventional display device for each such visual display.

According to several embodiments of the present invention, the disclosed systems and methods involve a gaming machine adapted for accepting a wager, playing a game based on the wager and granting a payout based on the result of the game. This gaming machine can include an exterior housing arranged to contain a plurality of internal gaming machine components, an MGC adapted to control one or more game aspects, a reversible display device configured to display multiple visual images from multiple surfaces, and one or more optical devices adapted to redirect at least one of these visual images such that it is not viewed directly from the liquid crystal display cell. In addition to controlling various game aspects, the MGC can also be in communication with and control one or more aspects of the various internal components within the gaming machine. The reversible display device can be in communication with the MGC, can be located within or about the exterior housing of the gaming machine, and can have a plurality of virtual curtains that are adapted to alternate between blocking and permitting the display of various visual images.

In one particular embodiment, the reversible display device is an LCD configured to display a first visual image from a first surface and a second visual image from a second surface opposite the first surface. In addition to the virtual curtains, this LCD has an LCD cell and various illumination components, all of which are arranged such that light is reflected into and through the LCD cell in one direction to display the first visual image at the first surface and then in an opposite direction to display the second visual image at the second surface. This can involve a repeated pattern of darkening or "closing" one virtual curtain at a blocked surface and clearing or "opening" another virtual curtain at a viewed surface, along with a coordinated activation and deactivation of lamps or illumination components as appropriate. When repeated at a "frame rate" of an appropriate number of frames per second, a single LCD cell can be made to display multiple visual images in different directions, such as to both the first and second surfaces of the LCD. These multiple visual images can be the same or completely different, and can be repeated static images, video streams or a combination of both.

Video display devices other than an LCD can also be used, and such other devices can include an LED, a plasma display, a field emission display, a digital light processing display, and an electroluminescence display, among others. Such other display devices preferably have a cell or similar core display component, and can also use virtual curtains at multiple surfaces that alternate between blocking and displaying the content of the cell or other core display component. In the event that separate illumination sources are needed, such as for an LCD, then such lamps or illumination components can be similarly provided. Where the cell or core display component is self-illuminating, such as for an LED or EL display, then additional lamps or illumination components may not be necessary.

In another particular embodiment, a gaming system is provided. This gaming system includes a plurality of input and output devices adapted to accept wagers, play games and grant payouts based on the results of the games, an MGC in communication with at least one of these input and output devices and adapted to control one or more game aspects, and at least one single reversible display device in communication with the MGC and configured to display multiple visual images of gaming events from multiple surfaces to one or more players. In one instance, one visual image of a gaming event is displayed from one surface to one player at a given viewing position, while another visual image of a gaming event is displayed from another surface opposite the first surface to another player at another viewing position separate from the first given viewing position. As in the foregoing embodiment, this reversible display device can have an LCD cell or other core display component, as well as a plurality of virtual curtains adapted to alternate between reflecting light into the LCD cell or other core display component and permitting light from the LCD cell or other core display component to pass therethrough and be displayed. One or more illumination components may also be included, if necessary. In addition, one or more optical devices may also be included, if desired.

In yet another embodiment, a method of displaying visual images at a gaming machine adapted for accepting a wager, playing a game based on the wager and granting a payout based on the result of the game is provided. This method can include the steps of providing a gaming machine having a reversible display device that is similar or identical to those as noted above, communicating various visual images to an LCD cell or similar core display component, opening and closing various virtual curtain such that light from the LCD cell or other such component can or cannot substantially pass therethrough as appropriate, and displaying the various visual images for various time intervals from their respective surfaces of the display device while the various virtual curtains are in appropriate states for such displays. In one particular embodiment under this method, such a process can include opening a first virtual curtain such that light can pass therethrough, closing a second virtual curtain such that light cannot substantially pass therethrough, and displaying a first visual image for a first time interval from a first surface of the reversible display device while the first virtual curtain is open and the second virtual curtain is closed. This particular embodiment can also include the steps of closing the first virtual curtain, opening the second virtual curtain, and displaying a second visual image for a second time interval from a second surface of the reversible display device while the first virtual curtain is closed and the second virtual curtain is open. Preferably, the second time interval does not overlap the first time interval. This process can then be repeated for a sufficient number of cycles per second, such that the first and second images can appear to be constantly displayed at the two different surfaces. Various additional steps can also be included, such as providing one or more optical devices within said gaming machine, and arranging such an optical device or devices to redirect a visual image such that it is not viewed directly from the display device.

In more detailed embodiments, the optical device or devices can include a lens or a mirror, such as a parabolic mirror adapted to redirect and enlarge a visual image. Such a lens, mirror, or set of lenses and/or mirrors can be adapted such that the first and said second visual images are simultaneously viewable by the same viewer or at the same viewing position despite any relative orientation of the original display device surfaces with respect to one another. A visual image can be viewable at a given viewing position directly from the LCD or other reversible display device, while another visual image is redirected by one or more mirrors, lenses or other optical devices such that it is also viewable at that given viewing position. This other visual image can be enlarged, reduced, inverted, reversed, flipped or otherwise distorted by the optical device or devices. In some instances, these visual images can be positioned as adjacent to one another. In such cases, control of both of these visual images can be coordinated to create at least one combined and coherent scene, character, icon or other image that spans at least a portion of both visual images.

Other detailed embodiments include provisions for different visual images from the same reversible display device to depict separate and unrelated gaming events being played simultaneously by different players. Such separate and unrelated gaming events can be controlled by the same MGC of a single gaming machine. In other detailed embodiments, these different visual images from the same reversible display device can depict the same gaming event. This can involve the same image being shown in multiple locations, or can involve differing visual representations of the same gaming event, such as in the case of a poker hand where the down cards for a given player can only be seen in the view attributed to that player.

According to still further detailed embodiments of the present invention, which can include some or all of the steps or features of one or more of the foregoing general or detailed embodiments, the disclosed systems and methods can include the provision of multiple LCD cells or similar core display components within a single reversible display device. In such instances where two LCD cells or similar core display components are used, these components can be positioned adjacent to one another such that light passing through both of them forms a combination image of the separate visual images displayed by each cell or similar component. The separate visual images can be displayed simultaneously from one surface to form a resulting combination image that appears to be three-dimensional. These visual images can be designed such that there is or is not any overlap in any image portions with respect to both visual images. More than two LCD cells or similar core display components can be used in a similar fashion for added depth and other effects.

In such embodiments where multiple LCD cells or other similar core display components are used, additional method steps can include communicating a third visual image to the added LCD cell or similar component, and displaying that third visual image from the first surface of the reversible display device during the first time interval while the first virtual curtain is open and the second virtual curtain is closed. The first and third visual images can be displayed simultaneously from the first surface of the reversible display device such that the third image overlaps at least a portion of the first image to form a combination image, which might then appear to be three-dimensional. Further steps can involve communicating a fourth visual image to the added LCD cell or similar core display component, as well as displaying that fourth visual image from the second surface of the reversible display device during the second time interval while the first virtual curtain is closed and the second virtual curtain is open. More steps can be added accordingly for more LCD cells or the like.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing multiple visual images within a gaming machine or gaming system. These drawings in no way limit any changes in form and detail that may be made to the invention by one skilled in the art without departing from the spirit and scope of the invention.

DETAILED DESCRIPTION

Figure 1:
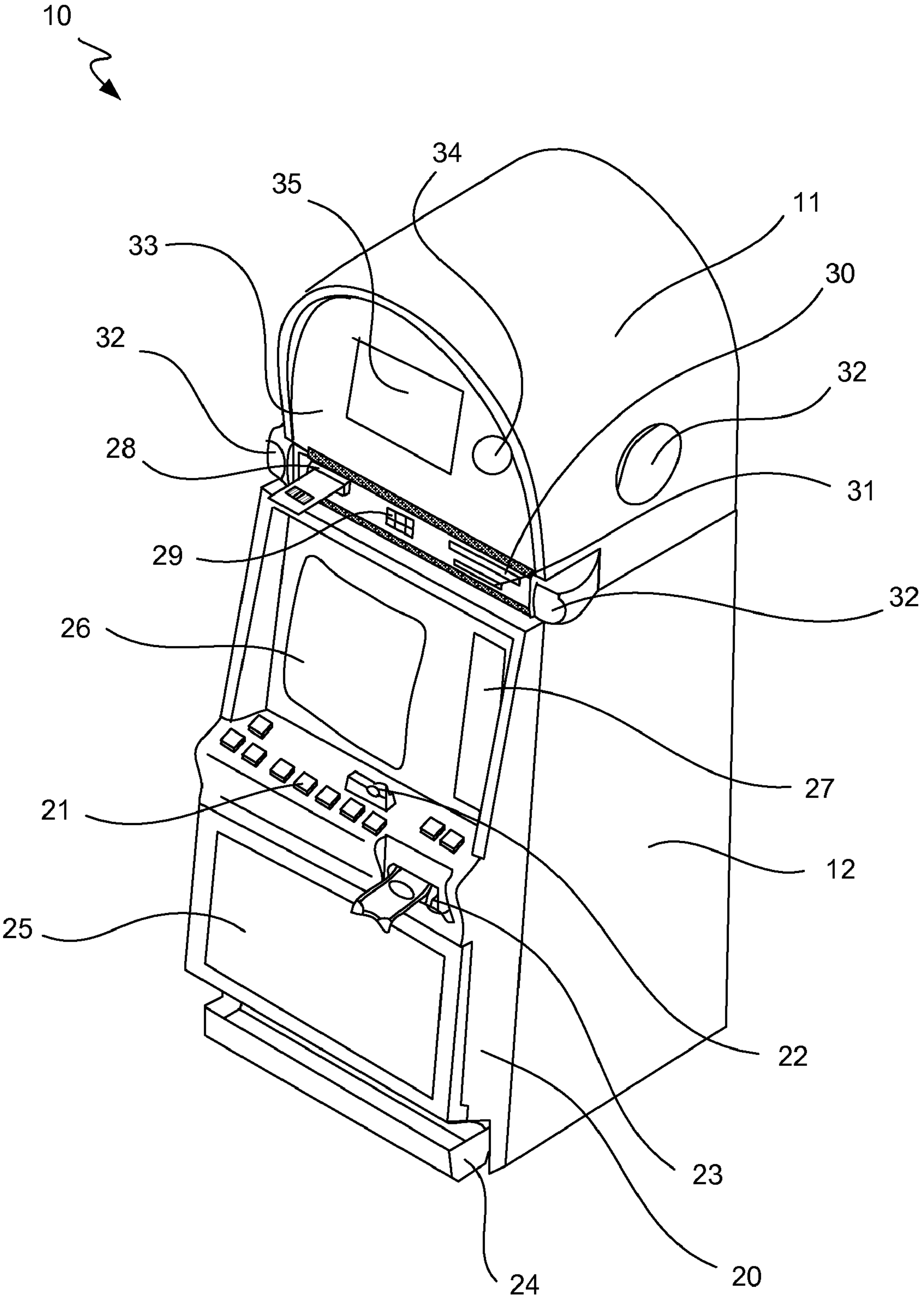
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of inexpensive yet appealing and innovative visual displays in or about a gaming machine or gaming system. This is accomplished in part by presenting multiple visual images at or about a gaming machine from a single source at the gaming machine. Such a single source can be a reversible display device or an LCD cell or other similar core display component within the reversible display device, with this single source or reversible display device being adapted to display visual images at multiple distinct surfaces. Again, such visual images can be repeated or "static" images and/or video streams, and multiple visual displays can be provided without requiring a separate CRT, LCD, flat panel display, plasma display or other device for each such visual display.

Another advantage of the disclosed apparatuses, systems and methods is the ability to reduce the volume of and corresponding space and cooling requirements for one or more visual display devices within and about a gaming machine with respect to the display area of the display device. In particular, the space and cooling requirements for a given display or set of displays can be cut in half or more by using a single display device that is adapted to provide multiple visual images for multiple display screens or projections. Accordingly, another advantage that can be realized by the present invention is that a single display device can be made to display two entirely different games on different viewing screens, as well as different views of the same game on different viewing screens. Such a game or set of different games can be controlled by a single CPU or MGC, with this MGC and all other devices, screens and components belonging to a single gaming machine.

Yet another advantage of the present invention is the reduced cost that is associated with such a powerful combination of a reversible display device and the associated multiple visual image distribution systems and methods disclosed herein. In general, a typical reversible display device can be used to provide two displays for roughly the cost of one-and-one-half displays where conventional display devices are implemented. While the cost of a reversible display device is generally higher than that of a conventional display device, and the cost of any additional optical devices and components that may be required must also be taken into account, these added costs can still only amount to approximately one-half of the cost of a separate added conventional display device, such that the use of the apparatuses and methods herein can prove to be extremely cost effective, particularly where two displays are desired.

Although the present invention is directed primarily to gaming machines and systems, it is worth noting that some of the apparatuses, systems and methods disclosed herein might be adaptable for use in other types of devices or environments, such that their use is not restricted exclusively to gaming machines and contexts. Such other adaptations may become readily apparent upon review of the inventive devices, systems and methods illustrated and discussed herein. The remainder of the detailed description herein first provides general discussions of gaming machines and of reversible display devices, such as a reversible LCD. Following that, specific embodiments of specialized gaming machines and optics configurations are provided, after which a specific variation of a multi-cell reversible display device is provided. Next, exemplary network and system configurations are given. Finally, one method of displaying multiple visual images from one source at a gaming machine is given.

Gaming Machines

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features and functions may also be used in association with gaming machine 10, and it is specifically contemplated that the present invention can be used in conjunction with such a gaming machine or device that might encompass any or all such additional types of features and functions. Gaming machines such as these and other variations and types are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

With respect to the basic gaming abilities provided, it will be readily understood that gaming machine 10 can be adapted for presenting and playing any of a number of gaming events, particularly games of chance involving a player wager and potential monetary or other payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features, functions and devices may also be used in association with gaming machine 10, and it is contemplated that the present invention can be used in conjunction with a gaming machine or device that might encompass any or all such additional types of features, functions and devices. One item that is specifically contemplated for use with the present invention involves a gaming machine that incorporates a reversible display device, with such a device being able to provide multiple visual images rather than a single visual image, as is the case for a conventional display device.

Reversible Display Devices

Many conventional display devices, such as a CRT, an LCD, an LED, a flat panel display and a plasma display, among others, are designed such that a single visual image is provided on a screen or other end display component. Use of the term "single visual image" is intended to convey the concept of the entire display or screen image provided by such a conventional display device, with a typical example being that of the full rectangular display of most commercially available television sets. Many such displays tend to have a 4:3 aspect ratio, while others provide a 16:9 aspect ratio. Other aspect ratios and shapes for such display screens or other end display components may be available, albeit not as common. In virtually all such instances, the display screen provides and is in and of itself a single visual image, which is the entirety of that which is projected to or otherwise shown on the screen.

Conversely, a reversible display device is one that is adapted for providing multiple visual images at each of two or more of such display screens or other end display components. Such a result can be arrived at through innovative engineering designs that expand the use of the central display cell or other core display component of a typical display device. Such techniques are though to be applicable to several different types of display devices, with such devices including an LCD, many types of LEDs, a flat panel display, a plasma display, a field emission display, a digital light processing display, and an electroluminescence ("EL") display, among others. In some regards, the display device itself is quite different, as it can contain additional internal components and be adapted to project visual images or displays to multiple discrete surfaces, such as to a front side and a backside of the display device.

Figure 2A:
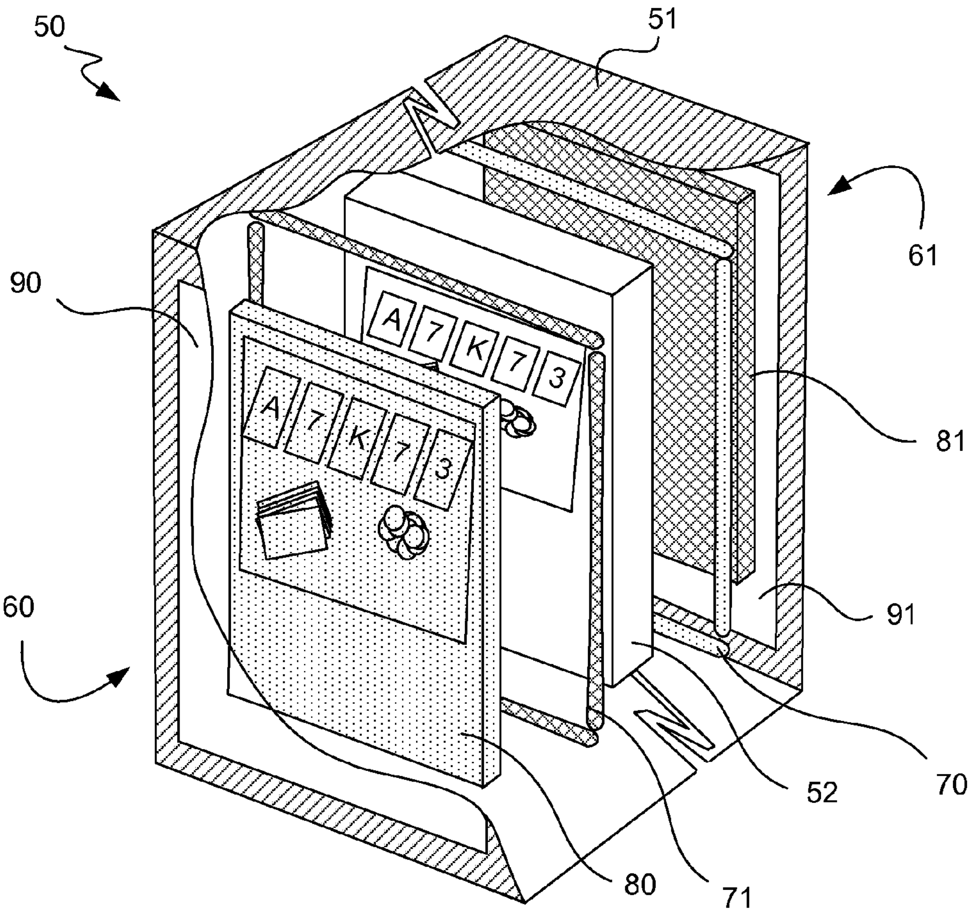
FIG. 2A illustrates in exploded and partially cutaway perspective view an exemplary reversible liquid crystal display device according to one embodiment of the present invention.
Figure 2B:
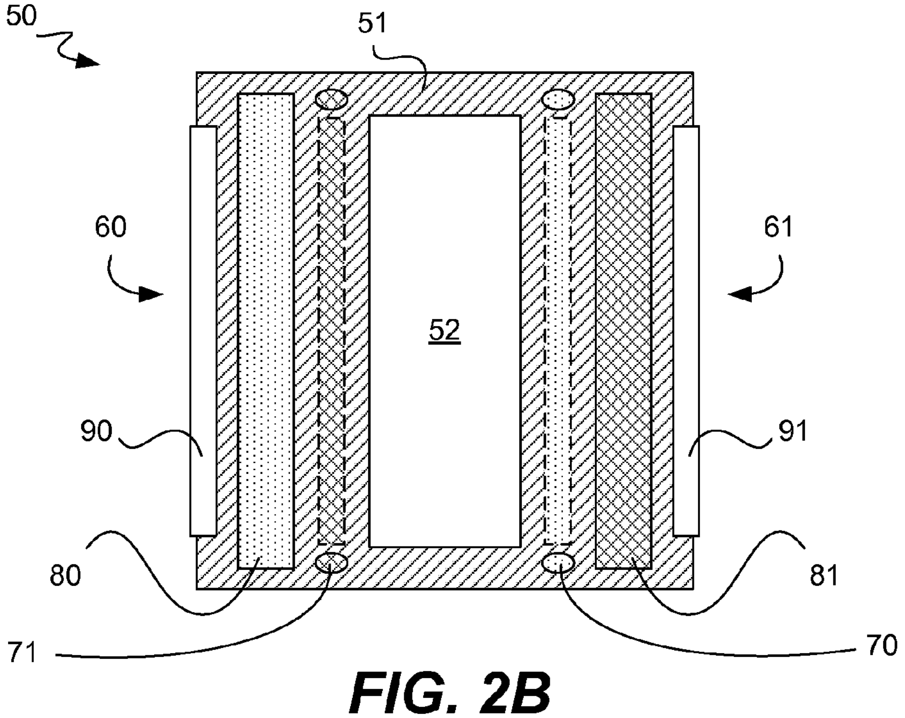
FIG. 2B illustrates in widened side cross-sectional view the exemplary reversible liquid crystal display device of FIG. 2A.

One particular example of such a device is shown in FIGS. 2A and 2B, which illustrate different views of the same display device. FIG. 2A illustrates in exploded and partially cutaway perspective view a reversible LCD device 50 that is adapted to display two different visual images to two different and opposing surfaces. FIG. 2B illustrates the same reversible LCD device in a widened or "horizontally stretched" side cross-sectional view. It will be understood that these two illustrations are not to scale, and are only being presented to show the general relative positions and relationships of various device components. In fact, the view shown in FIG. 2B would not likely be as clear if an attempt were made to illustrate all components to scale, due to the relative thinness of some components, as will be readily appreciated.

Reversible LCD device 50 includes an exterior housing 51 and an LCD cell 52, which can be substantially similar to a conventional LCD cell having various light filtration capabilities, the construction and operation of such an LCD cell being known in the display arts. Other components and items that can be substantially similar to those of a conventional LCD device include a front viewing surface 60, one or more illumination components 70, and a display screen or similar projection or end display component 90. As is generally known, a typical LCD device does not have a cell that is adequately self-illuminating, such that one or more lighting elements must be used to shine light through the cell and onto an end display component such as a display screen in order to create the end visual image. Such lighting elements or illumination components 70 can be a cold cathode fluorescent lamp ("CCFL") series or arrangement, for example, as well as a light pipe, light guiding plate, or any other suitable lighting source. These CCFLs or other illumination components are preferably positioned behind the LCD cell 52 such that the applied light will pass through the LCD cell and project onto the display screen 90 at front surface 60. As is generally known, a typical LCD device will have a blackened or darkened plate or region behind these CCFLs or illumination components to maximize the efficiency of the light provided to shine through the LCD cell and onto the screen.

In addition to these typical standard LCD items, reversible LCD device 50 also includes a second or back viewing surface 61, a second set of CCFLs or other similar illumination components 71, and a second display screen 91, all of which are similarly adapted to display a visual image projected through LCD display cell 52. In order to provide a suitable blackened or darkened backdrop or region for both visual displays shown at surfaces 90, 91, a pair of "virtual curtains" 80, 81 are also provided within reversible LCD device 50. These virtual curtains 80, 81 can be made from any number of suitable elements and construction techniques, and are preferably adapted to alternate between being blackened or darkened, such that substantially all light is reflected therefrom, and transparent or clear, such that substantially all light is passed therethrough. In one embodiment, virtual curtains 80, 81 can be made from a thin liquid crystal film that is adapted to form a solid black or darkened sheet when power is applied to the virtual curtain, and to revert to a transparent or clear sheet when power is removed from the virtual curtain. Alternatively, power can remain on to a virtual curtain at all times, and varying signals can indicate when the film therein is to be dark or clear. In addition, solid sheets of a darkened or clear makeup may not be fully necessary, so long as the essential purpose of substantially reflecting or passing light therethrough by the virtual curtain is accomplished.

As can be seen from FIG. 2A, the LCD cell 52 has been configured to aid in the creation of a visual image containing a video poker hand. As shown, the second or back virtual curtain 81 has been darkened, the first set of CCFLs 70 are on, the second set of CCFLs 71 are off, and the first or front virtual curtain 80 has been rendered clear. Accordingly, the visual image containing a video poker hand will be projected through the clear first virtual curtain 80 and made visible on first screen 90 at front viewing or first surface 60. In order for this visual image of a video poker hand, or any other visual image for that matter, to be visible at second screen 91 on the back viewing or second surface 61, it is preferable that at least four items change. This includes the first virtual curtain 80 turning dark, the second set of CCFLs 71 turning on, the first set of CCFLs 70 turning off, and the second virtual curtain 81 turning clear. Accordingly, the depiction of a visual image from cell 52 at the first viewing surface 60 of reversible LCD device 50 involves the coordinated use of lamps 70, cleared virtual curtain 80 and screen 90. Conversely, the depiction of a visual image from cell 52 at the second viewing surface 61 involves the coordinated use of lamps 71, cleared virtual curtain 81 and screen 91.

Of course, it will be readily apparent that no visual image is projected to screen 90 when virtual curtain 80 is darkened, or to screen 91 when virtual curtain 81 is darkened. Should both virtual curtains be clear simultaneously, it could be possible for visual images corresponding to the configuration of cell 52 to be seen at the same time at both screens. The lighting requirements for such a mutual display render such an option as unlikely, however, since perception of the set of lights in front of the cell would likely dominate any image projected through the cell itself on both ends. On the other hand, it is possible to create the impression that visual images are being displayed simultaneously at both screens by applying standard rapid frame animation techniques, the use of which are common in the display arts. For example, the on and off alternating of each set of illumination components and each virtual curtain can be coordinated such that visual images are displayed back and forth to each opposing display screen in alternating fashion.

As the rate of this alternating process is sped up to an appropriate number of cycles per second, the human eye can be made to see one continuous visual image at a given screen. Such rates can range anywhere from a few cycles to hundreds or thousands of cycles per second, or more. By way of reference, many conventional CRTs sweep visual images to a screen at a rate of about 30 cycles per second, which has been found to be adequate in portraying a fluid visual image of continuous motion or action to most human observers. Although such a rate, or even a slower rate, may be adequate for present purposes, faster rates are typically thought to be of better quality in general when it comes to displaying visual images, and video in particular. A specific example of a faster rate that can be achieved without extreme burden to a system is about 60 frames or cycles per second for each screen. Thus, 120 frames or cycles per second of the LCD cell would be needed to project 60 frames to each of the two opposing screens. Accordingly, even though visual images are typically not displayed at both opposing screens at any given instant in time, the practical effect of such a rapid frame animation technique is that for all intents and purposes, two visual images (i.e., first and second visual images) are being displayed simultaneously at two different (i.e., first and second) viewing surfaces or screens.

As will be readily appreciated, the image that is configured for display within the LCD cell 52 can be the same visual image that is shown at both screens, with no adjustment taking place between its display at the first surface and at the second surface. In such an arrangement, no change to the display configuration within the LCD cell takes place before or during the switching of the CCFLs and virtual curtains, such that the visual image shown at first screen 90 is actually viewed as reversed upon its display at second screen 91. Alternatively, the same visual image can be shown at second screen 91, with the LCD cell being reconfigured before, during or after the switching process to "flip" the visual image within the LCD cell, such that the same left to right visual image is perceived at second screen 91 upon its projection or display there.

As yet another alternative, the LCD cell can be entirely reconfigured for each half-cycle, such that a completely different visual image is displayed at second surface 61 (i.e., screen 91) with respect to that which is shown at first surface 60 (i.e., screen 90). For example, while one screen or viewing surface might depict a static image such as an advertisement or non-moving game logo or pay table, the obverse screen might depict a live game being played, a video clip of a stored game that was previously played, a text message, or a video feed of a movie, television program, sporting event, or any other video content. In fact, both screens can be made to display separate programming involving static images, game play, video feeds, or any other content, and can effectively appear to operate independently of each other, by simply reconfiguring the LCD cell at every half-cycle of the ongoing frame animation type display process. In this manner, the two separate screens can be configured to display completely unrelated content, or can be coordinated to show content that is related, various alternatives for which are described in greater detail below.

One example of a reversible LCD device application is that which has been developed by Mitsubishi Electric Corp. of Japan. Mitsubishi Electric has developed at least two variations of a reversible LCD, and both were demonstrated in February of 2004 at its research and development center in western Japan. In the devices shown by Mitsubishi Electric, the structure includes an LCD cell that is sandwiched between two light guiding plates, with light from an LED being fed into and reflected by each light guiding plate at an appropriate time. This light penetrates the LCD cell and the other light guiding plate, and then presents a visual image at the appropriate screen. Although a conventional light guiding plate is typically not transparent, Mitsubishi Electric has also developed and implemented transparent light guiding plates. Use of such plates as the illumination sources thus enables the creation of a similar reversible LCD device. Although the demonstrated devices were generally designed for use in a cellular telephone, similar applications can be made on a larger scale to create large television or monitor sized reversible LCD devices.

As noted previously, it is specifically contemplated that other display types beyond an LCD can be used with the reversible display devices of the present invention. One example of an alternative type of display that can be used in such an application might include an EL display, such as an organic EL that can have several advantages over LCD. A typical EL display contains fine pixels that are several tens of microns in diameter, which themselves emit light, thus eliminating the need for back-lighting as in an LCD device. This feature also enables an organic EL display to be paper-thin, which can result in a significant space savings in comparison with other types of displays. Organic EL displays can be particularly useful in that they also typically combine the strengths of a CRT and an LCD in terms of the stability and clarity of an image. Other types of displays that might also be used in such a reversible display device can include specialized LED displays, plasma displays, field emission displays, which are essentially a combination of recent electronics and CRT technologies, and digital light processing displays, which are adapted to use light control technologies that are typically employed at astronomical observatories.

In some cases, such as for a specialized LED or EL display, the cell or core display component is self-illuminating, such that sets of CCFLs or other similar illumination components are not needed. In other cases, such as for the specific LCD embodiment illustrated and described above, the cell or core display component does not generate light on its own, such that one or more separate lighting sources must be used. Where separate illumination components are required to illuminate that which is configured for display in the cell or core display component, the reversible display device arrangement and operation will generally follow that which is described above for an LCD type device. Where the cell or core display element is self-illuminating, however, the illumination components, such as CCFLs 70, 71, can be eliminated from the device, along with the need to alternatively activate and deactivate these lamps or components, as described above.

Specialized Gaming Devices

Figure 3A:
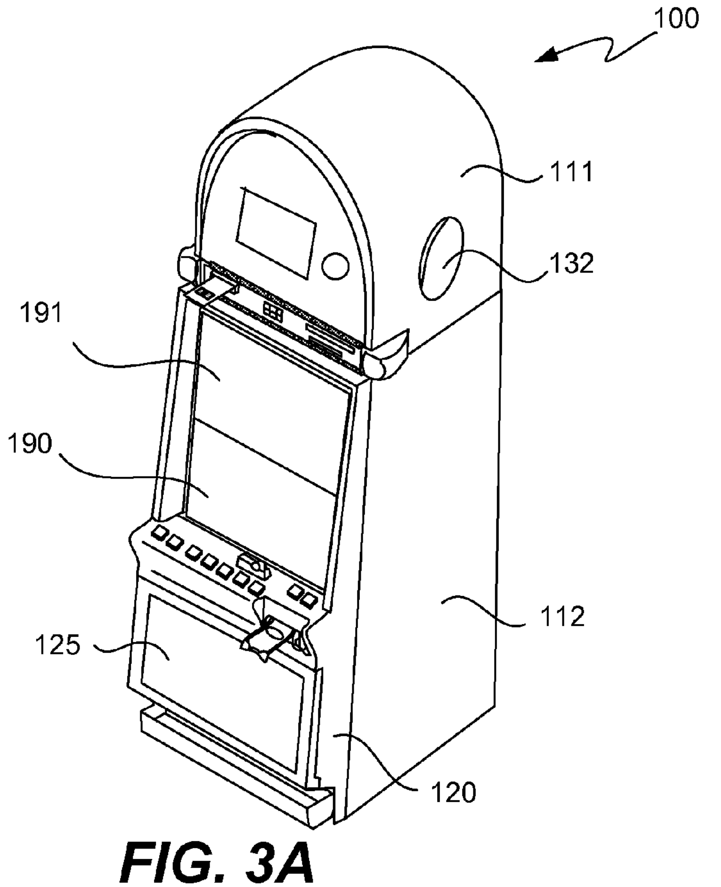
FIGS. 3A and 3B illustrate perspective views of exemplary specialized gaming machines according to various embodiments of the present invention.
Figure 3B:
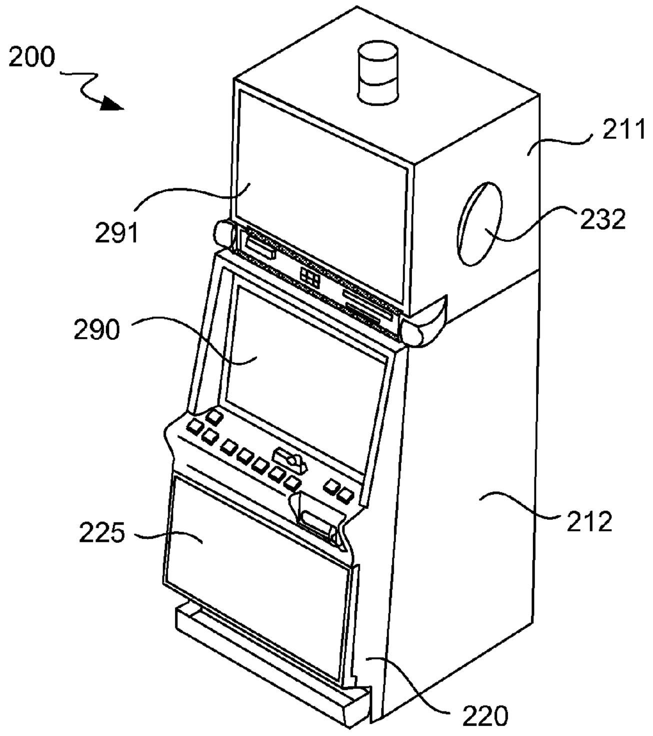

Moving next to FIGS. 3A and 3B, a pair of exemplary specialized gaming machines adapted to incorporate a reversible display device are both illustrated in perspective view. FIG. 3A depicts specialized gaming machine 100, which is similar to gaming machine 10 above in that it also includes a top box 111 and a main cabinet 112, one or both of which can comprise an exterior housing arranged to contain a number of internal gaming machine components. Many features can also be the same or similar to corresponding features in gaming machine 10, such as a main door 120, a belly glass 125, one or more speakers 132, an MGC (not shown) and various other peripheral devices and gaming machine components. As can be seen, however, the primary display of specialized gaming machine 100 is significantly different than that of gaming machine 10 above. Rather than a simple and straightforward conventional display device being implemented as its primary display, gaming machine 100 has a larger and more innovative primary display area, which can include a lower section 190 and an upper section 191. Depending upon the gaming machine design and details of the display device implementation, there may or may not be a bar, divider or other visible separation between these primary display sections. Upper and lower sections 190 and 191 can also be side-by-side, adjacent by some other approach, or placed into any other position or relative arrangement, as desired. As noted in greater detail below, upper and lower display sections 190, 191 can be display screens or other end display components, and preferably project or otherwise display the visual images from different surfaces of a reversible display device, such as one of the reversible display devices discussed above, below, or any other such device.

Referring now to FIG. 3B, specialized gaming machine 200 is similar to gaming machines 10 and 100 discussed above in that it also includes a top box 211, a main cabinet 212, a main door 220, a belly display or glass 225, one or more speakers 232, an MGC and various other peripheral devices and gaming machine components. As in the case of specialized gaming machine 100, however, the visual display areas of specialized gaming machine 200 are significantly different than those of gaming machine 10 above. While gaming machine 200 has a primary display 290 that is more akin to that found in gaming machine 10, gaming machine 200 also contains a secondary display 291 in its top box and another display 225 where a standard static belly glass might ordinarily reside. This belly display 225 can simply be a duplicate of secondary display 291, or it can be a separate tertiary display adapted to display content different from both primary and secondary displays 290, 291. Alternatively, gaming machine 200 might not contain one of secondary display 291 or belly display 225, such that only primary display 290 and one other display is present. As in the case of gaming machine 100, displays 290, 291, 225 can similarly be screens or other end display components, and preferably represent the visual images displayed from different surfaces of a reversible display device, such as one of the reversible display devices discussed above, below, or any other such device.

Although the gaming machine 100 and 200 of FIGS. 3A and 3B are both specialized gaming machines, it will be readily appreciated that a wide variety of devices can be used in conjunction with the inventive apparatuses, systems and methods disclosed herein. Such other devices can be specialized gaming devices with displays, as well as any other device that can be implemented with a specially adapted reversible display device and/or other optical components, as disclosed and detailed herein. Although it will be understood that such other applications can be used with the inventive systems and methods disclosed herein, the focus here shall remain on examples involving actual gaming machines for purposes of this discussion.

Figure 4:
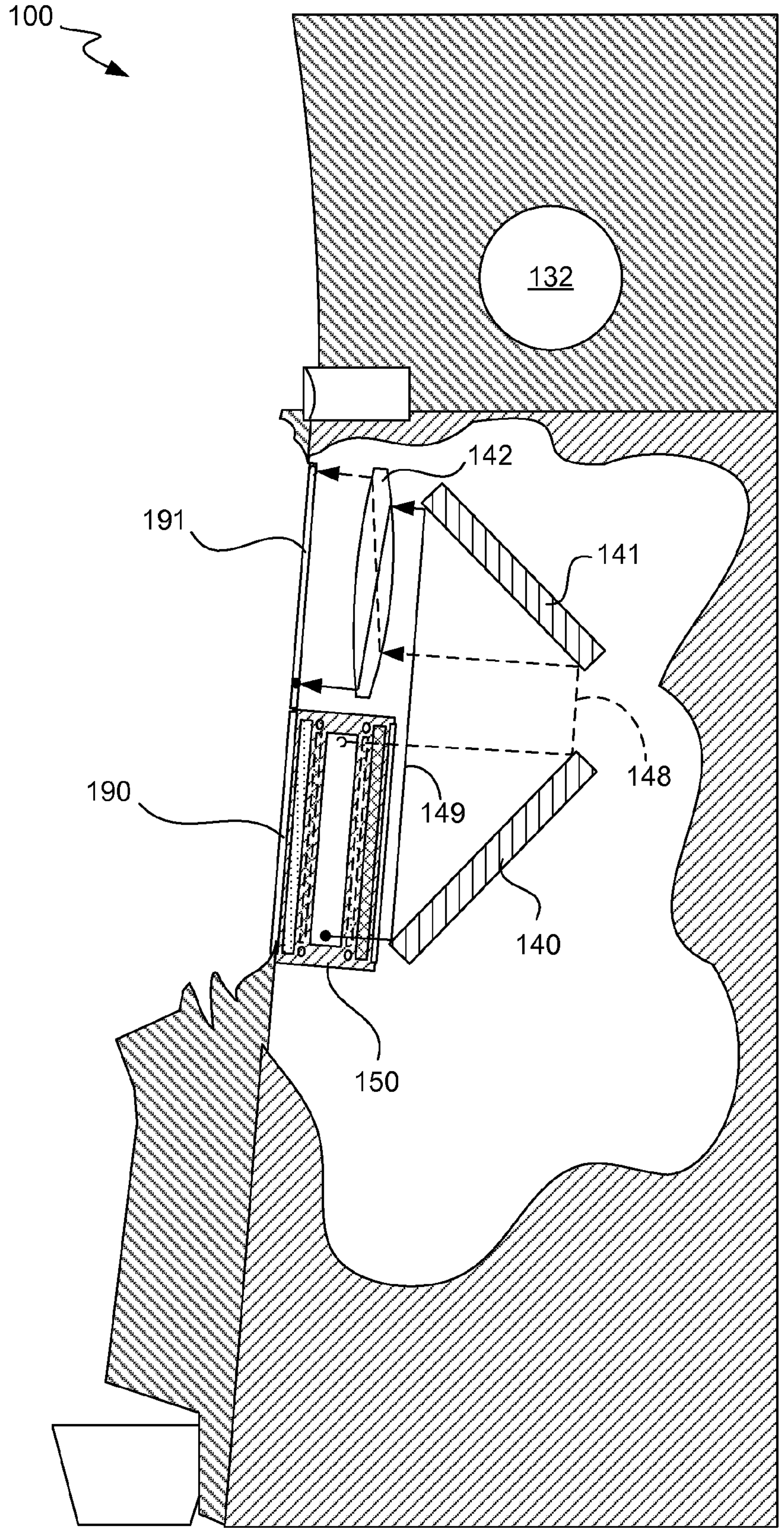
FIGS. 4 and 5 illustrate partial cutaway side cross-sectional views of exemplary arrangements for a reversible display device and associated optical devices within a specialized gaming machine such as that shown in FIG. 3A according to various embodiments of the present invention.

Turning now to FIG. 4, one exemplary arrangement for a reversible display device and associated optical devices within a gaming machine such as that shown in FIG. 3A is illustrated in partial cutaway side cross-sectional view. As is also illustrated in FIG. 3A, specialized gaming machine 100 contains two display screens 190, 191 that are arranged such that they are adjacent to one another, in this case top to bottom. Such an adjacent arrangement can result in the creation of what is effectively one large display, particularly where the visual images shown at both of these display screens are coordinated. A reversible display device 150 is positioned such that one of its display surfaces or display screens is directly at display screen 190 of gaming machine 100. Of course, an added sheet or piece of glass or plastic might be positioned directly outside reversible display device 150, such as within or about the exterior housing of the gaming machine, to insulate or protect the actual reversible display device from direct contact by players or other outside users.

In one embodiment, reversible display device 150 can be the reversible LCD made by Mitsubishi Electric, as described above. Alternatively, reversible display device 150 can be identical or substantially similar to the reversible LCD device 50 discussed above, the reversible LCD device 55 discussed below, or any other suitable reversible display device that has been adapted to display visual images at opposite surfaces of the device. As noted above, such a device might also be an LED display, a flat panel display, a plasma display, a field emission display, a digital light processing display, or an EL display, among others. This reversible display device 150 is preferably in communication with the gaming machine MGC, and can also be made to incorporate other display device components, such as a touch screen or other input component, the implementation and use of which may be desired in conjunction with the inventive apparatuses, systems and methods disclosed herein.

As can be seen, the second or top display screen 191 or other end display component of gaming machine 100 does not display a visual image directly from the reversible display device 150. Rather, this second display screen displays a visual image from the reversible display device that has been redirected from the backside of the actual display device. It will be readily appreciated that such an arrangement of direct and non-direct displays can be inverted simply by locating the reversible display device 150 at the top display screen 191, as desired. Alternatively, the actual reversible display device 150 can be arranged such that neither of screens 190, 191 displays a visual image directly from the display device itself. At any rate, the redirection of any visual image can be accomplished by implementing one or more associated optical devices, such as mirrors 140, 141 and lens 142.

In the particular embodiment as shown in FIG. 4, a first mirror 140 is placed at an angle of about 45 degrees with respect to the visual image projected or displayed directly from the backside surface of reversible display device 150. This mirror 140 reflects the visual image to a second mirror 141, which is placed at an angle of about 90 degrees with respect to first mirror 140. The visual image is then reflected from second mirror 141 to a lens 142 that is interposed between the second mirror and the end display screen 191. Of course, additional mirrors might also be used if desired, with the relative placement and angles of all mirrors being adjusted accordingly where more than two mirrors are used. Lens 142 can actually be a series or set of lenses, as might be practical, and is preferably designed and placed such that the visual image is enlarged as it passes through the lens or lens set, in order to offset any "tunneling" effect that might result from the distance that the visual image must travel from the display device 150 to the end display screen 191. As will be readily appreciated, the fact that a visual image is made to travel from the backside of the display device to the end display screen tends to result in a finally displayed image that is somewhat smaller than the visual image as originally displayed.

In addition to enlarging this visual image, lens or lens set 142 can also be designed and positioned such that it flips and/or inverts the visual image as well. A top to bottom visual image inversion might be desirable due to the natural inversion process that occurs through the double reflection from mirrors 140 and 141. A left to right visual image flipping might be desirable due to the fact that the reflection from mirrors 140 and 141 will be reversed where these mirrors are simple flat mirrors. Of course, where a complex lens or lens set might be perceived as impractical, a simpler single lens could be used where image flipping and/or inverting is not needed. This might be accomplished by using one or more appropriately curved mirrors in place of or in addition to simple flat mirrors 140, 141. Alternatively, the entire undertaking of redirecting the backside visual image can be simplified by merely generating and displaying an inverted and/or flipped visual image at the reversible display device itself. Such an option can be relatively simple where the display of such an image is electronically controlled, where a simple flip or invert command or function in the display device itself can be used, such that the original visual image displayed at the device backside is inverted or flipped, as desired.

In any event, the particular embodiment shown in FIG. 4 utilizes two substantially flat or planar mirrors 140, 141, and an enlarging inverting lens 142. As can also be seen, two paths are shown here to indicate what can generally happen to various elements of the visual image as it is redirected and manipulated by the optical devices 140, 141, 142. A hollow circle at the top of the cell or other core display component of reversible display device 150 follows a broken path 148 that reflects from both mirrors, passes through lens 142, and arrives at the top of end display screen 191. Similarly, a solid circle at the bottom of the cell or other core display component of the reversible display device follows a solid path 149 that also reflects from both mirrors and passes through the lens. The result of this specific example is that the final visual image at screen 191 is upright and the same size as compared with the originally produced visual image, but is inverted from right to left with respect to the original visual image. As noted above, this reversed image effect can be corrected simply by displaying an original image that is reversed with respect to that which is intended to be displayed at screen 191.

Figure 5:
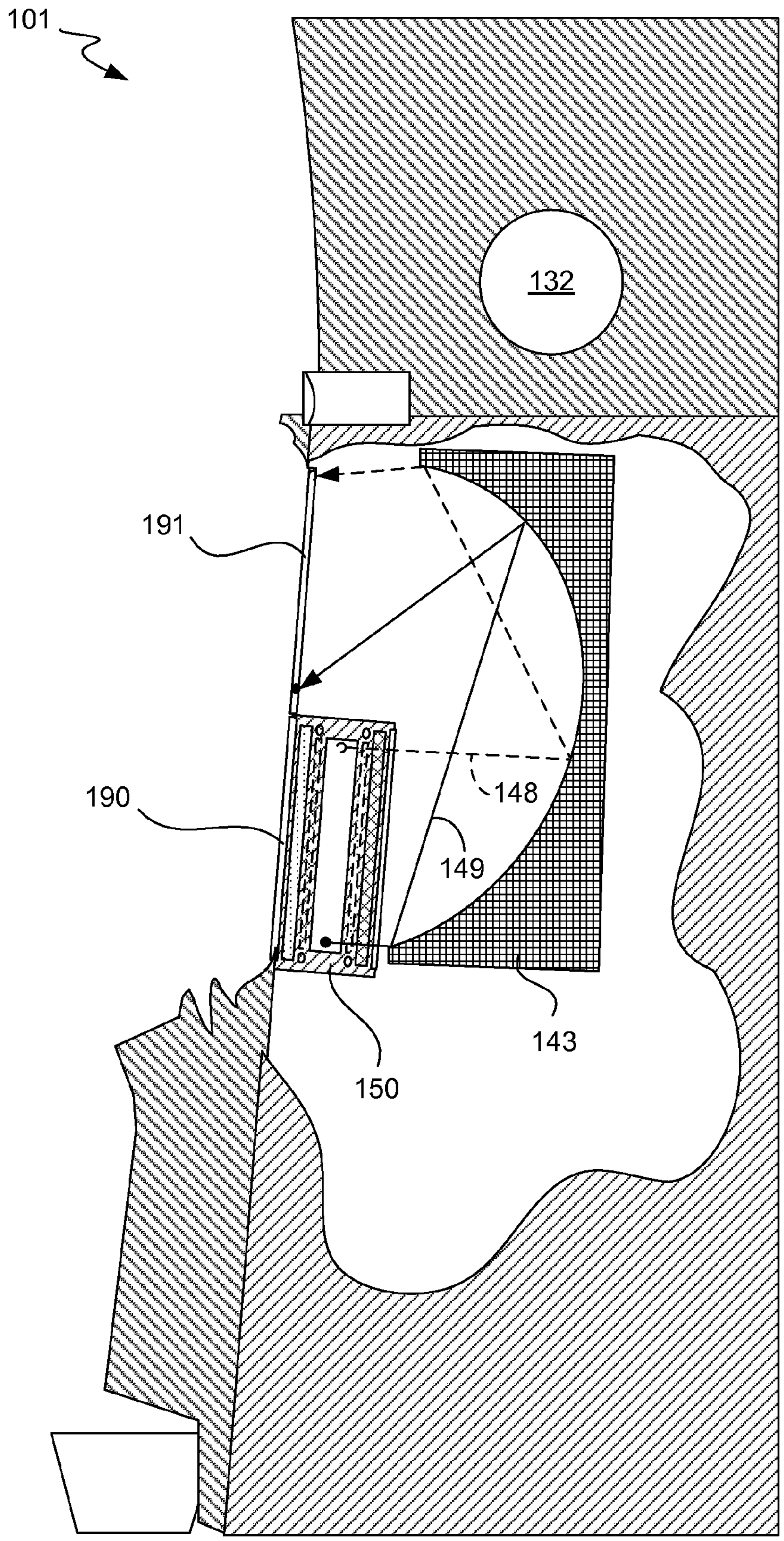

Continuing to FIG. 5, another exemplary arrangement for a reversible display device and associated optical devices within a gaming machine such as that shown in FIG. 3A is similarly illustrated in partially cutaway side cross-sectional view. Specialized gaming machine 101 is identical or substantially similar to gaming machine 100 in many respects. Unlike specialized gaming machine 100, however, specialized gaming machine 101 utilizes a different optical device approach to achieve the same result of displaying the backside visual image of reversible display device 150 to end screen 191. Rather than using two mirrors and a lens, a single optical device 143 having a specially curved surface is implemented. This optical device 143 is specifically designed so that its curved surfaces reflect the visual image from the backside of the display device in a way such that the final visual image that is projected or otherwise displayed at screen 191 is upright and correctly sized. As in the foregoing example using flat mirrors, a constant cross-section across all of optical device 143 as shown would result in a final visual image that is similarly flipped from right to left. Although a three-dimensional curvature might possibly be designed such that a flipping of the visual image can also be accomplished, such a complex solution may be unnecessary where the original visual image can simply be flipped at the start.

In either embodiment of gaming machine 100 or 101, both of the display screens 190 and 191 are positioned as adjacent to one another, such that the displayed visual images are similarly positioned in an adjacent manner. Control of the displays of both of these visual images can thus be coordinated to create at least one combined and coherent scene, character, icon or other image that spans at least a portion of both of these screens or visual images. For example, a card can appear to be dealt by a virtual dealer that is shown on the upper display screen 191, with the card traveling downward across the screen and then appearing in a fluid motion at the lower display screen 190 as the card appears to exit the upper display screen. Further, one or more large renderings of a gaming reel can traverse both screens in a combined image, with movement of the reel and reel symbols or images thereupon being coordinated such that the appearance of one large coherent display screen is produced. Coordination of displays across multiple distinct screens to create a coherent display that is larger than any of the individual screens is well known in the display arts, and any of a number of such display coordination techniques can be implemented on the MGC and/or any other appropriate gaming machine processor, device or remote server.

Conversely, separate and non-coordinated visual images can be shown on display screens 190 and 191, with such separate visual images either relating to different views of the same gaming event, different gaming events, or different events entirely. For example, one screen might be selected to show a gaming event, while the other is made to display a sporting event or other unrelated video feed. As will be readily appreciated, there are a virtually infinite number of possibilities as to how these two display screens or regions can be used with respect to one another, and it is specifically contemplated that any such coordinated or non-coordinated relationship, alternative or version can be used in conjunction with the present invention.

Figure 6:
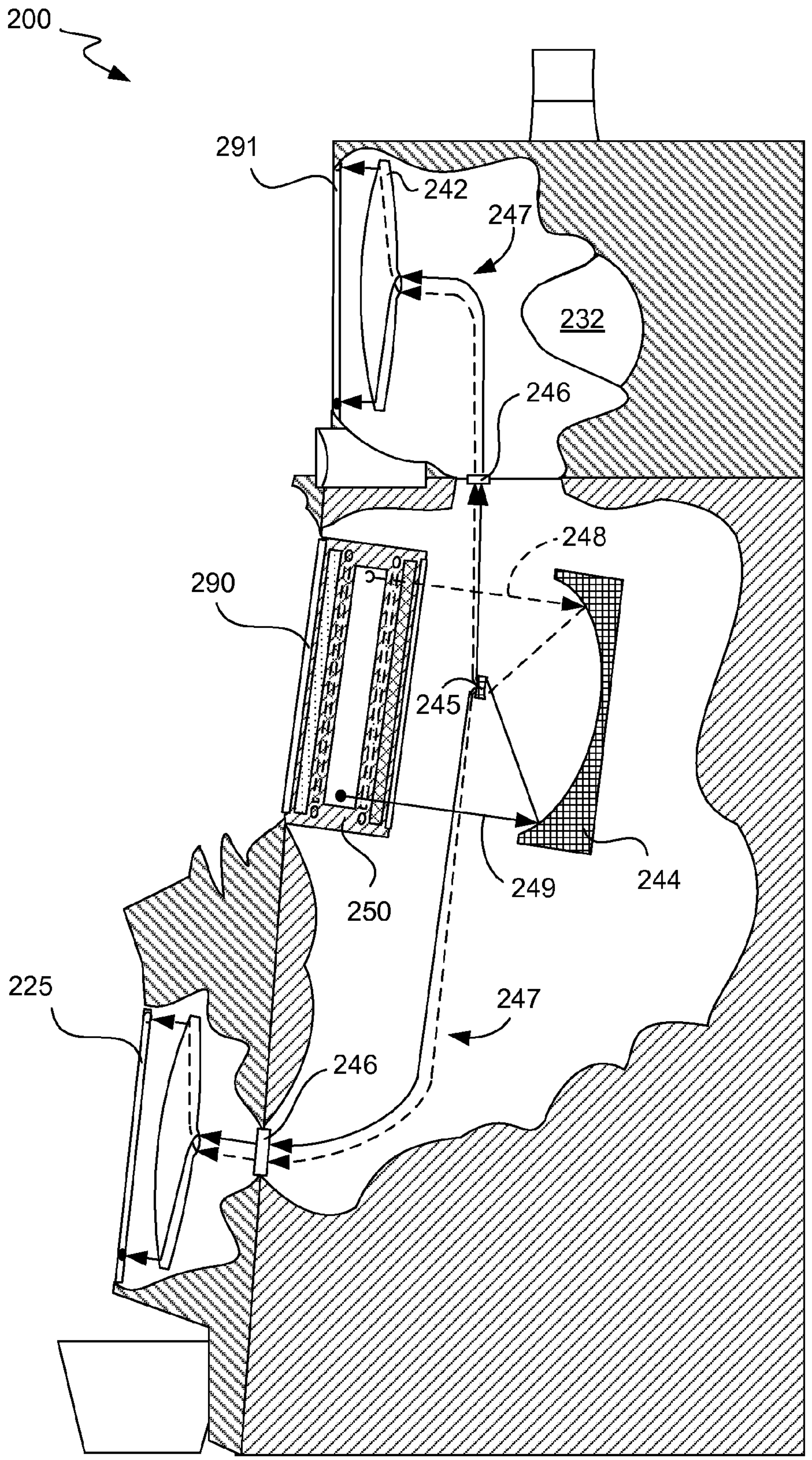
FIG. 6 illustrates in partial cutaway side cross-sectional view an exemplary arrangement for a reversible display device and associated optical devices within a specialized gaming machine such as that shown in FIG. 3B according to one embodiment of the present invention.

Referring next to FIG. 6, an exemplary arrangement for a reversible display device and associated optical devices within a gaming machine such as that shown in FIG. 3B according to one embodiment of the present invention is similarly illustrated in partially cutaway side cross-sectional view. As is similarly illustrated in FIG. 3B, specialized gaming machine 200 contains two display screens 290, 291 that are arranged in a formation similar to that of the primary display and secondary top box display found in exemplary gaming machine 10 above. An additional belly display 225 may also be incorporated as a third or tertiary display in specialized gaming machine 200, if desired. Unlike gaming machines 100 and 101 above, this specialized gaming machine 200 does not present visual displays that are side-by-side or otherwise adjacent to one another. Although optical devices and optical techniques similar to those used in the above examples could certainly be used here as well, yet another specific optics possibility is provided for purposes of illustration.

As in the foregoing examples, a reversible display device 250 is positioned such that one of its display surfaces or screens is directly at display screen 290 of gaming machine 200, with the backside display surface having its visual image ported or redirected to one or more other display screens. As noted above, it may also be desirable to arrange the reversible display device 250 such that none of its surfaces or display screens is directly viewable by a player or user. As shown here, however, the front or first display surface can be seen directly by a player or other viewer at screen or display glass or panel 290. The back or second display surface of the reversible display device 250 is redirected such that it is seen at both top box display screen 291 and at belly display 225. Of course, two such identical displays are not necessary, and may not be desirable in many instances. Where background or player attraction information such as pay tables, game artwork, advertisements and the like are to be displayed, however, such a dual display might prove to be convenient and relatively inexpensive to duplicate. Alternatively, an image splitter or other advanced optical device or system might be used to separate the backside image and present a different half or portion of that image at screens or end display components 291 and 225.

As shown, the back or second display surface of the reversible display device 250 is reflected by a parabolic mirror 244 or other similar device to a central focal point receptive device 245. The visual image concentrated at this device can then be ported via one or more fiber optic cables or light pipes 247 to screens 291 and 225. Because both of these screens reside at different gaming machine locations, it may be desirable to implement an interface 246 or other similar component where the main cabinet meets the top box and/or where the main door attaches to the main cabinet of the gaming machine. Such an interface 246 can simply be a convenient ported location for passing through a continuous fiber optic cable or light pipe, or it may be a more sophisticated optical device adapted to accept a ported visual image, continue porting the visual image itself, distribute the ported image to another fiber optic cable or light pipe, and possibly perform one or more additional optical functions on the ported visual image, as desired.

In any event, the ported visual image eventually winds up at a lens 242 or other optical device adapted for expanding the image for projection to or otherwise displaying at the respective screen or end display 291, 225. Such a lens 242 might be a fisheye lens or other appropriate optical device adapted for such a relatively rapid image expansion result, as desired. While image porting can take place in a wide variety of ways and with many different technologically advanced devices, it is a particular feature of the present invention that no other conventional display monitor or device is necessary to display or otherwise present the redirected visual image from the backside of reversible display device 250. Accordingly, the optical devices and items that are used to port and eventually display this visual image are preferably relatively inexpensive and produce little or no heat in comparison with a conventional display monitor or device. As such, other visual image redirection and manipulation techniques using these and other optical devices may also be used to show the second surface or backside image from the reversible display device, and such alternative techniques and devices are similarly contemplated for use in the present invention.

Figure 7A:
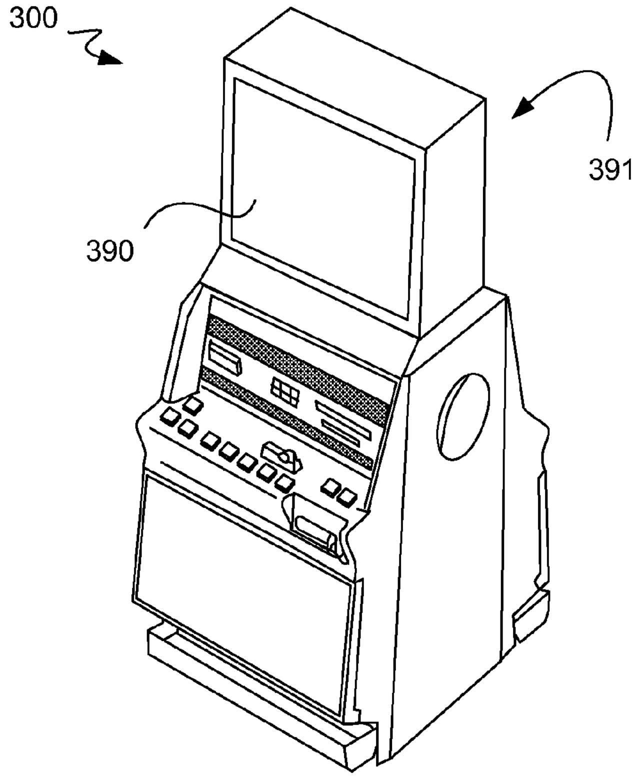
FIG. 7A illustrates in perspective view yet another exemplary specialized gaming machine according to one embodiment of the present invention.
Figure 7B:
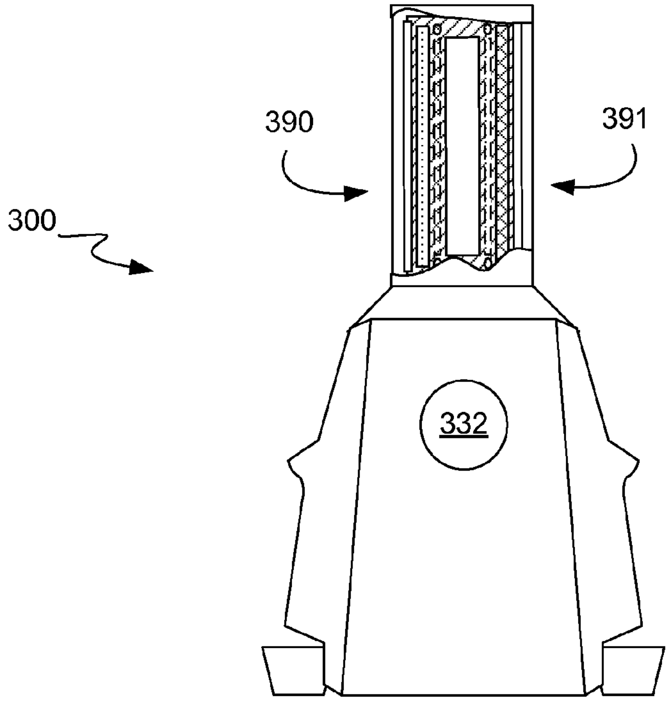
FIG. 7B illustrates in partial cutaway side cross-sectional view the exemplary specialized gaming machine of FIG. 7A.

In yet another embodiment, a reversible display device can be used in conjunction with a gaming machine or system where no redirection or significant manipulation of any visual image is accomplished. FIGS. 7A and 7B illustrate in perspective and partial cutaway side cross-sectional views yet another exemplary specialized gaming machine according to this other embodiment. Specialized gaming machine 300 is designed such that two players can be playing at opposite sides of the gaming machine. Of course, such a gaming machine can also be designed such that three, four or even more players can also be playing simultaneously at the gaming machine, if desired. This gaming machine 300 is similar in many regards to each of the foregoing gaming machines, in that it does contain various displays, one or more identical or similar speakers 332, an internal MGC, and various other inputs, a coin tray, a ticket printer and various other assorted gaming machine peripherals and devices. The displays are somewhat different than any of the foregoing gaming machines, however, with at least one display being prominent at the top of the gaming machine at both front and back sides of the gaming machine.

At a front or first side of the gaming machine 300 where a first player or viewer might be located, a first primary or top box display 390 provides a first visual image to the first player or viewer. In addition, at a back or second side where a second player or viewer might be located, a second primary or top box display 391 provides a second visual image to the second player or viewer. As noted above, these different displays 390, 391 can be coordinated to show the same exact visual image to both players or viewers, or to show different views of the same game, or to show visual images that are to different games or are otherwise completely unrelated. As one example, specialized gaming machine 300 can be configured to play a game of virtual poker, whereby the first player and second player can play against each other, and where each player can only see the down cards attributed to his or her own hand.

As should be apparent from at least the partial cutaway cross-sectional view of FIG. 7B, the actual display device used in specialized gaming machine 300 can be any of the reversible display device examples disclosed herein, as well as any other reversible display device that is suitably adapted to display visual images from both a front and a back side. Such a reversible display device can substantially fill the top box or upper portion of the gaming machine 300, as shown, or can be housed in a manner such that other components might also co-exist within the outer housing of the gaming machine top box or upper portion. For example, communication or power wires for a top light or other top box component might be housed to the sides of the reversible display device. In any event, the visual images that are displayed can effectively be shown directly from the surfaces of the reversible display device itself, although security or safety items such as a panel of display glass or plastic may be imposed atop the actual display surfaces and/or at the gaming machine housing.

Multi-Cell Reversible Display Device

Figure 8A:
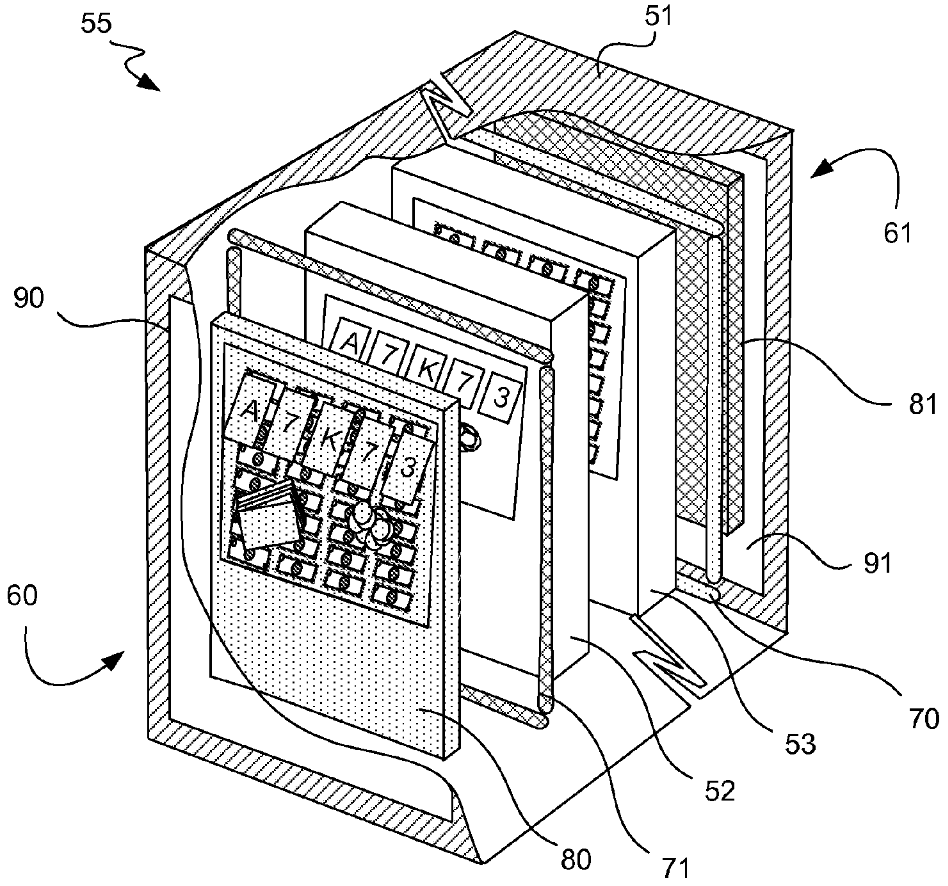
FIG. 8A illustrates in exploded and partially cutaway perspective view an alternative exemplary reversible display device having two display cells according to one embodiment of the present invention.
Figure 8B:
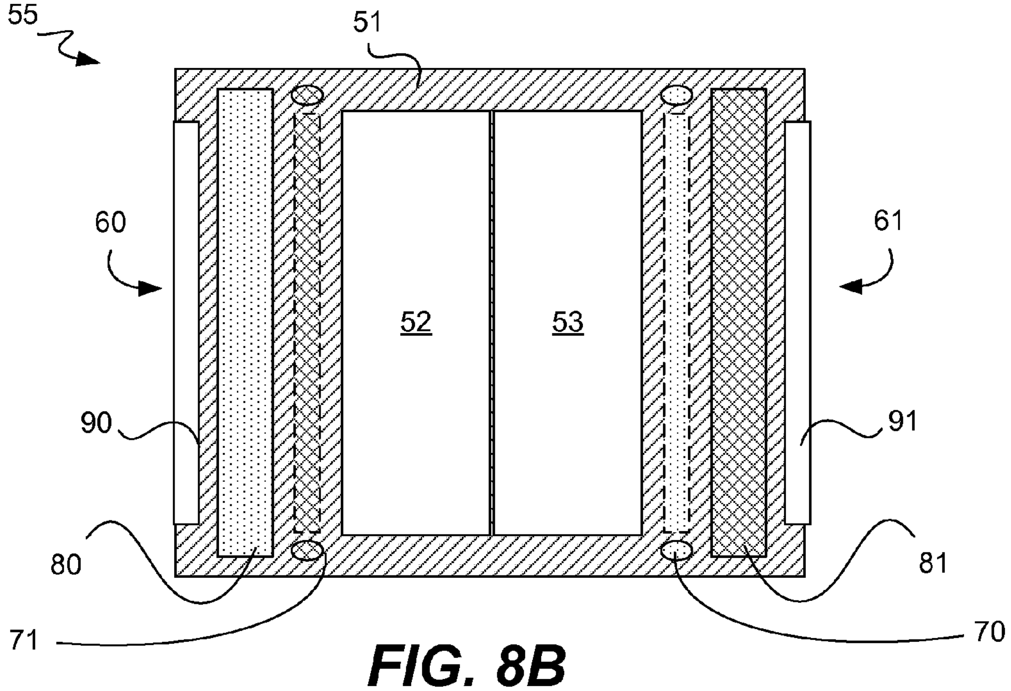
FIG. 8B illustrates in widened side cross-sectional view the alternative exemplary reversible display device of FIG. 8A.

Turning next to FIGS. 8A and 8B, an alternative and more sophisticated reversible LCD device having two LCD cells is illustrated in two different views. Similar to FIGS. 2A and 2B, FIG. 8A illustrates this reversible double-celled LCD device 55 in exploded and partially cutaway perspective view, while FIG. 8B shows this same device in widened side cross-sectional view. As in the foregoing example of reversible LCD device 50 above, it will be understood that these two illustrations are similarly not to scale, and are only being presented to show the general relative positions and relationships of various device components. As in the above example, reversible double-celled LCD device 55 is also adapted to display two different visual images to two different and opposing surfaces. In fact, many of the components of device 55 can be identical or substantially similar to those of device 50 in the above example, as can be readily appreciated.

One significant difference in device 55, however, is that this device has an added LCD cell 53 that is positioned adjacent to the first LCD cell 52. Under such an arrangement, configurations of visual images or light filter arrangements can be made in both of the LCD cells to create a combined projected visual image that appears to have added depth and/or other three-dimensional characteristics. For example, as shown in FIG. 8A, the first LCD cell 52 depicts a poker hand, while the second LCD cell contains a background "wallpaper" style image of paper money. As it passes through "cleared" virtual curtain 80, the combined visual image can then be seen as a primary poker hand image atop a background of paper money. This same combined visual image will then be projected to or otherwise displayed at front surface 60, such as at screen 90. Of course, it will be readily appreciated that any kind of image can be shown in second LCD cell 53, and that such an image does not necessarily need to be wallpaper, background or even secondary to the visual image depicted in the first LCD cell 52. Rather, such a visual image can be coordinated with that which is shown in the other LCD cell, such that an eye-catching combination image with added depth, relative motion, and other three-dimensional effects can be perceived.

The operation of this double-celled reversible display device 55 can be quite similar to that of device 50 above, where illumination components and virtual curtains are activated in a coordinated altering fashion to create visual images back and forth at front and back surfaces 60 and 61. A notable difference in the operation of this double-celled device, however, is that it may become necessary to input visual image displays to both cells at each cycle or half-cycle, such as where it is desired that the visual image in each cell should change at each cycle or half-cycle. Thus, where a single LCD cell 52 might receive a first visual image for display at the front or first surface 60, and then a second visual image for display at the second or back surface 61 upon a half-cycling or first toggling of each illumination component and virtual curtain, the second LCD cell 53 might receive a separate third visual image for display at the front surface 60 and a separate fourth visual image for display at the back surface 61. If considered in this fashion, the first and third images are displayed together at the front surface 60, and the second and fourth images are then displayed together at the back surface 61.

Where any of these first through fourth images is to change from frame to frame, an update of that changing image may then need to be communicated to the reversible display device, or at least to the appropriate LCD cell. Of course, the same effect is true for the simpler reversible display device having only one cell or core display component. Alternatively, a reversible display device can be equipped with one or more memory or storage components, such that a plurality of visual images can be stored at the display device itself. Preferably, such a plurality of stored visual images includes an intended succession of frame-by-frame visual images, such that at least some portion of a streaming video or other changing visual display can be stored on the device, such as in a buffer or similar storage component.

As in the foregoing embodiments, display device 55 also does not need to be an LCD type device. Other suitable display devices may also be effective when used in a back-to-back cell or core display component arrangement, and it is specifically contemplated that such other display device types may be similarly adapted as such. Further, third, fourth, or even more cells or core display components can be added in similar fashion where more complex three dimensional display effects are desired. Of course, consideration for additional visual image feeds or communication lines should also preferably be made, and faster or more processors and/or buffers or other storage devices might also be desirable where more cells or other core display components are added, particularly where continuous visual image changing capabilities are desired for each.

Network And System Configurations

Figure 9:
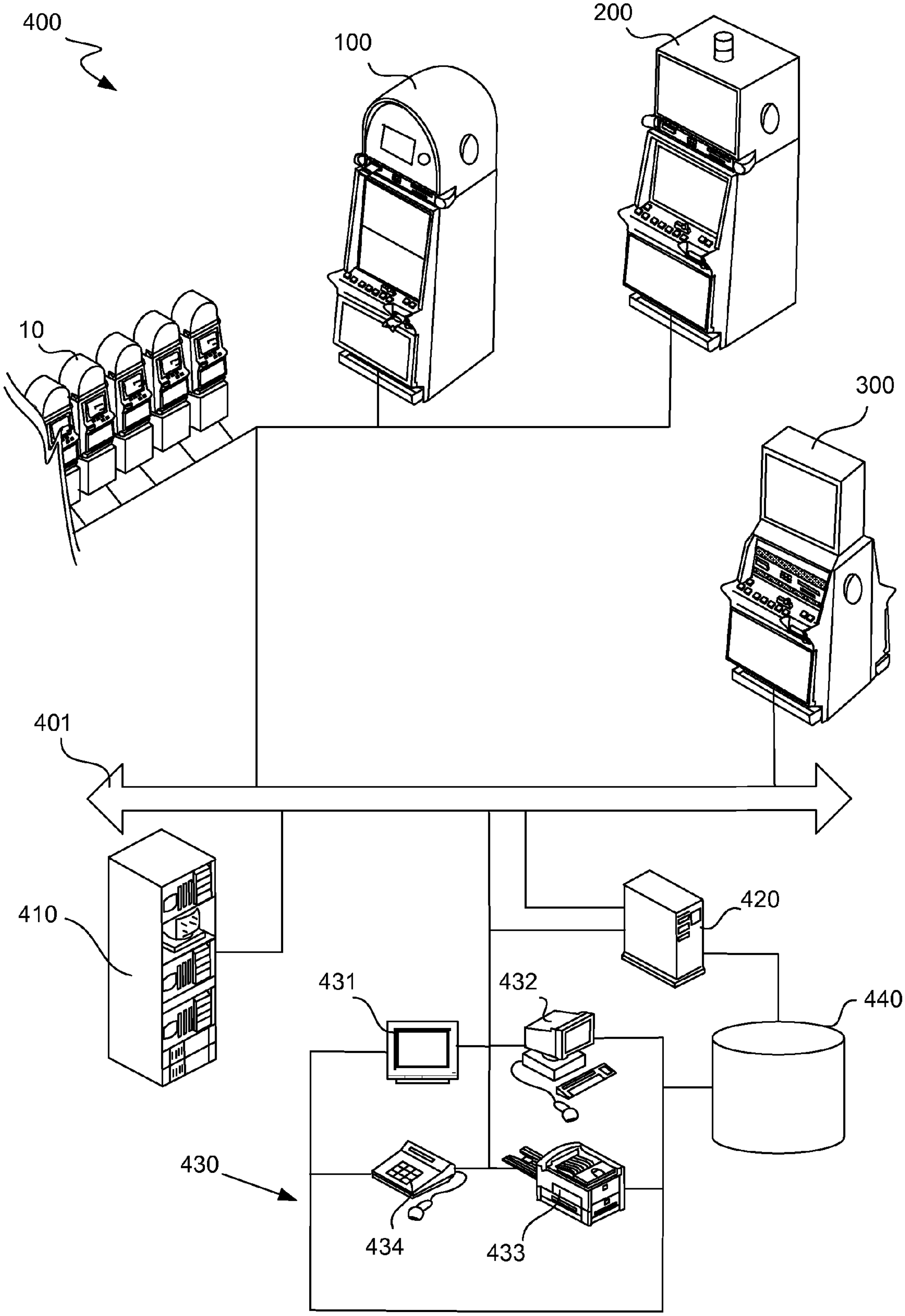
FIG. 9 illustrates a block diagram of an exemplary network infrastructure for providing a gaming system having one or more exemplary specialized gaming machines according to one embodiment of the present invention.

Turning now to FIG. 9, an exemplary network infrastructure for providing a gaming system having one or more alternative exemplary gaming machines according to one embodiment of the present invention is illustrated in block diagram format. Gaming system 400 comprises one or more specialized gaming machines, various communication items, and a number of host-side components and devices adapted for use within a gaming environment. As shown, one or more specialized gaming machines 100, 200, 300 adapted for use in gaming system 400 can be in a plurality of locations, such as in banks on a casino floor or standing alone at a smaller non-gaming establishment, as desired. Of course, other gaming devices such as gaming machine 10 may also be used in gaming system 400, as well as other similar devices not described in added detail herein.

Common bus 401 can connect one or more gaming machines or devices to a number of networked devices on the gaming system 400, such as, for example, a general-purpose server 410, one or more special-purpose servers 420, a sub-network of peripheral devices 430, and/or a database 440. Such a general-purpose server 410 may be already present within an establishment for one or more other purposes in lieu of or in addition to monitoring or administering some functionality of one or more specialized gaming machines, such as, for example, providing visual image, video or other data to such gaming machines. Functions for such a general-purpose server can include general and game specific accounting functions, payroll functions, general Internet and e-mail capabilities, switchboard communications, and reservations and other hotel and restaurant operations, as well as other assorted general establishment record keeping and operations. In some cases, specific gaming related functions such as player tracking, downloadable gaming, remote game administration, visual image, video or other data transmission, or other types of functions may also be associated with or performed by such a general-purpose server. For example, such a server may contain various programs related to player tracking operations, player account administration, remote game play administration, remote game player verification, remote gaming administration, downloadable gaming administration, and/or visual image or video data storage, transfer and distribution, and may also be linked to one or more gaming machines adapted for the transfer of remote funds for game play within an establishment, in some cases forming a network that includes all or substantially all of the specially adapted gaming devices or machines within the establishment. Communications can then be exchanged from each adapted gaming machine to one or more related programs or modules on the general-purpose server.

In one embodiment, gaming system 400 contains one or more special-purpose servers that can be used for various functions relating to the provision of gaming machine administration and operation under the present system. Such special-purpose servers can include, for example, a player verification server, a general game server, a downloadable games server, a specialized accounting server, and/or a visual image or video distribution server, among others. Of course, these functions may all be combined onto a single server, such as specialized server 420. Such additional special-purpose servers are desirable for a variety of reasons, such as, for example, to lessen the burden on an existing general-purpose server or to isolate or wall off some or all gaming machine administration and operations data and functions from the general-purpose server and thereby limit the possible modes of access to such operations and information.

Alternatively, gaming system 400 can be isolated from any other network at the establishment, such that a general-purpose server 410 is essentially impractical and unnecessary. Under either embodiment of an isolated or shared network, one or more of the special-purpose servers are preferably connected to sub-network 430. Peripheral devices in this sub-network may include, for example, one or more video displays 431, one or more user terminals 432, one or more printers 433, and one or more other digital input devices 434, such as a card reader or other security identifier, among others. Similarly, under either embodiment of an isolated or shared network, at least the specialized server 420 or another similar component within a general-purpose server 410 also preferably includes a connection to a database or other suitable storage medium 440.

Database 440 is preferably adapted to store many or all files containing pertinent data or information for gaming machines, system equipment, casino personnel, and/or players registered within a gaming system, among other potential items. Files, data and other information on database 440 can be stored for backup purposes, and are preferably accessible to one or more system components, such as at a specially adapted gaming machine 100, 200, 300, a general-purpose server 410, and/or a special purpose server 420, as desired. Database 440 is also preferably accessible by one or more of the peripheral devices on sub-network 430, such that information or data recorded on the database may be readily retrieved and reviewed at one or more of the peripheral devices, as desired. Although shown as directly connected to common bus 401, it is also contemplated that such a direct connection can be omitted and that only a direct connection to a server or other similar device be present in the event that heightened security with respect to data files is desired.

While gaming system 400 can be a system that is specially designed and created new for use in a casino or gaming establishment implementing specialized gaming devices such as gaming machines 100, 200 or 300, it is also possible that many items in this system can be taken or adopted from an existing gaming system. For example, gaming system 400 could represent an existing player tracking system to which specialized gaming machines are added. Also, new functionality via software, hardware or otherwise can be provided to an existing database, 440, specialized server 420 and/or general server 410. In this manner, the methods and systems of the present invention may be practiced at reduced costs by gaming operators that already have existing gaming systems, such as a standard player tracking system, by simply modifying the existing system. Other modifications to an existing system may also be necessary, as might be readily appreciated.

Method of Use

In general, the foregoing devices and systems can be utilized to benefit both gaming operators and players in creating and using specialized gaming machines that are adapted to provide appealing and innovative visual displays in a manner that is relatively inexpensive in comparison with many conventional gaming machines that utilize conventional visual display devices and techniques. As detailed above, this can be accomplished by incorporating a reversible display device within or about a gaming machine, such that multiple visual images can be displayed at multiple screens or viewing surfaces through use of the single reversible display device. In addition to reducing overall display costs, the volume of and corresponding space and cooling requirements for all displays within and about a gaming machine can also be reduced. Also, a single reversible display device can be made to display two entirely different games or different views of the same game on different viewing screens, as well as different views of the same game on different viewing screens. Furthermore, the multiple displays can be coordinated in several ways, such as to present coherent images that span or cross both screens. Other advantageous uses and benefits can also result through use of the inventive features, items and methods shown herein.

Figure 10:
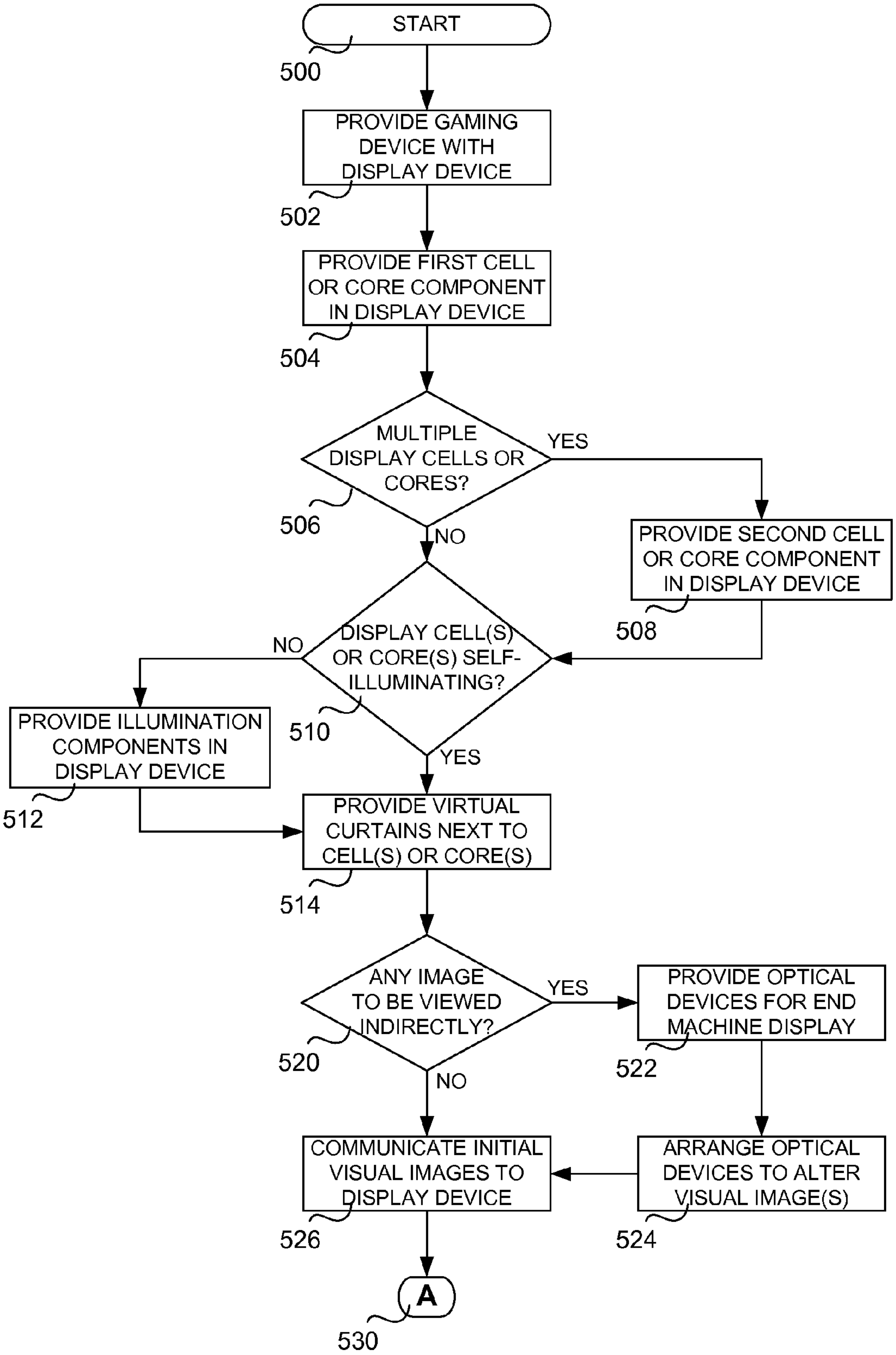
FIGS. 10 and 11 provide an extended flowchart of one exemplary method of displaying multiple visual images from a single source at a specialized gaming machine according to one embodiment of the present invention.
Figure 11:
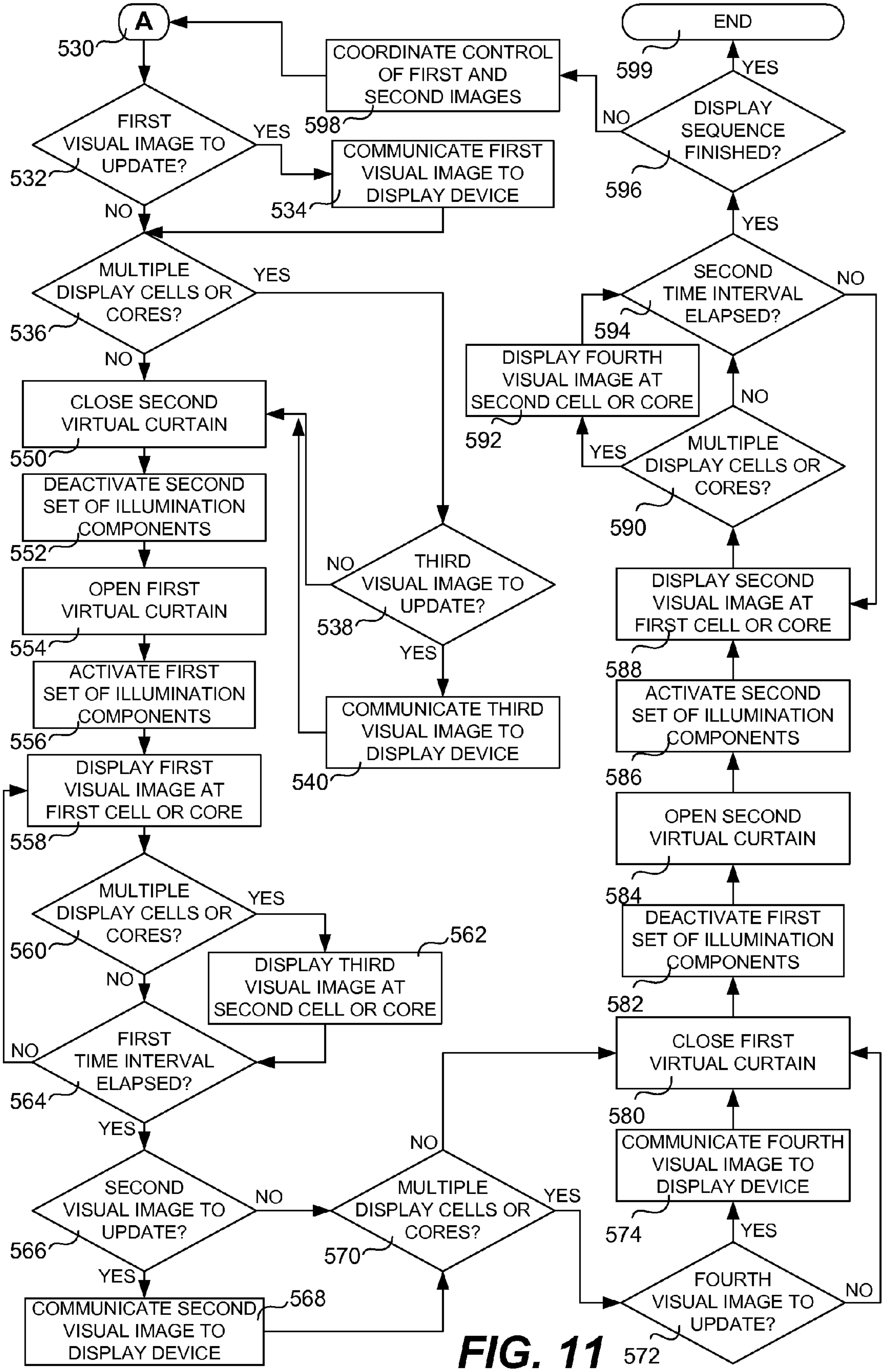

Referring lastly to FIGS. 10 and 11, an extended flowchart conveys one method of displaying multiple visual images from a single source at a specialized gaming machine according to one embodiment of the present invention. While this flowchart may be comprehensive in some respects, it will be readily understood that not every step provided is necessary, that other steps might be included, and that the order of steps might be rearranged as desired by a given gaming operator or gaming machine manufacturer, retrofitter or repairperson. This method begins in FIG. 10 at a start step 500, is continued at waypoint A 530 shown at the bottom of FIG. 10 and top of FIG. 11, and ends at an end step 599 in FIG. 11. After start step 500, a gaming machine or other relevant gaming device having a display device is provided at a process step 502. While such a device can be a gaming machine, such as any one of specialized gaming machines 100, 200 or 300 discussed above, it will also be understood that this gaming device could also be a gaming device with display device that is used at a table game, sports book, keno lounge, or other gaming location.

After the gaming device with a display device is provided at step 502, a first display cell or core display component is provided in the display device at a following process step 504. While steps 502 through 514 are directed primarily toward the specific design and creation of a customized reversible display device, it will be readily appreciated that such a device can be selected from any that are already commercially made and provided, such as that which might be available soon from Mitsubishi Electric. Accordingly, steps 502 through 514 might be condensed into one providing step where such an off the shelf device is used. At a next decision step 506, an inquiry is made as to whether multiple display cells or core display components are desired, such as in the case of reversible double-celled display device 55 above. If the answer to such an inquiry is yes, then the method diverts to a process step 508, where a second cell or core display component is provided in the display device. Although third and additional cells or core display components may also be similarly provided and accounted for in the current method, the present discussion will consider a maximum of only two such cells or core display components for purposes of simplicity. Also in the interests of simplicity, further use of the term cell shall refer to both cells and any other type of core display components, as applicable.

After such a process step 508, or where the inquiry answer to decision step 506 is no, the process then continues to a decision step 510, where an inquiry is made as to whether the display cell or cells are self-illuminating. If not, then the method diverts to a process step 512, where illumination components are also provided in the display device. After this step, or if a display cell or cells are self-illuminating, then the method continues to a process step 514, where virtual curtains are provided next to the display cell or cells. As noted in the double-celled example above, it may be necessary only to provide such virtual curtains at both ends of a multi-cell stack, as the combined image from all cells would not ordinarily require the use of virtual curtains between cells. Alternatively, however, some embodiments may include the use of such intervening virtual curtains, depending on the end visual effects desired.

The next decision step 520 involves an inquiry as to whether any visual image is to be viewed indirectly. If not, such as in the case of specialized gaming machine 300 above, then the method moves on to process step 526. If an indirect viewing or any other manipulation is desired, however, then the method diverts to process step 522, where one or more optical devices are provided for the end display of the gaming machine or device. At the following process step 524, this optical device or devices are arranged such that the visual image or images to be redirected or manipulated are so altered as desired. The process then continues to step 526, where an initial set of visual images is communicated to the reversible display device. At this point, the gaming machine or device is presumably in working order and adapted to display multiple visual images at multiple surfaces through the use of a reversible display device provided within the gaming machine. The method is then continued to a waypoint A 530, and is resumed at FIG. 11.

FIG. 11 depicts a subsequent portion of the overall method shown, with this second portion being repeated indefinitely so long as the gaming machine remains on or the display sequence is not otherwise discontinued, such as at final decision step 596. At the first decision step 532 of this repeatable looped portion of the method, an inquiry is made as to whether a first visual image is to be updated. This first visual image is noted as the visual image that resides within the first cell and is projected to or otherwise shown at the first display surface of the reversible display device. If this first visual image is to be updated, then the method diverts to process step 534, where a new first visual image is communicated to the display device. As noted above, the display device may actually have one or more memory or storage units, in which case such a step may not be practical or necessary upon every desired change of the visual image. Either way, the first visual image residing at the first cell is to be changed where the answer to decision step 532 is yes. After process step 534, or where the answer to the inquiry at decision step 532 is no, the method then continues to another decision step 536, where an inquiry is made as to whether multiple display cells are present in the reversible display device.

This multiple display cell inquiry is made several times in this process, notably at decision steps 536, 560, 570 and 590. At each such instance, an answer of yes results in a corresponding action taken with respect to the second cell, while an answer of no results in no diversion from the primary process for any second cell considerations. Similar diversionary paths can be implemented for a third cell, fourth cell, and so forth. If the answer is yes at step 536, then the process continues to a subsequent decision step 538, where an inquiry is made as to whether a third visual image is to be updated. This third visual image is noted as the visual image that resides within the second cell and is projected to or otherwise shown at the first display surface of the reversible display device. If the third visual image is to be updated, then this is accomplished at process step 540. Either way, the process then reverts to process step 550, which is also where the method continues in the event that multiple display cells are not present within the reversible display device at step 536.

At step 550, the half-cycling process begins, where any visual image that might be displayed at the second surface is discontinued, such that a visual image can be displayed at the first surface of the reversible display device. Accordingly, the second virtual curtain is closed at step 550, the second set of illumination components are deactivated at step 552, the first virtual curtain is opened at step 554, and the first set of illumination components are turned on or activated at step 556. Of course, an initial run through these process steps might encounter a situation where one or more of these process steps are not necessary, such as at for a starting power up condition where the second virtual curtain and set of illumination components are already off or deactivated. One or more of steps 550 through 556 may not be needed in such cases.

At the following process step 558, the first visual image is then displayed at the first cell, which presumably results in the display of that first image at the first surface of the reversible display device. As noted above, further manipulation of this first visual image may then occur within or about the gaming machine before the end visual image is displayed or perceived at the gaming machine, as desired. The next step 560 involves an inquiry as to whether multiple cells are used, in which case the third visual image is displayed at the second cell at process step 562. Under either a single or double cell embodiment, the following decision step 564 involves an inquiry as to whether an appropriate first time interval has elapsed. This first time interval simply represents the period of the half-cycle where the first (and possibly third) visual image is to be displayed at the first surface. Where there are to be 60 full cycles per second (i.e., 120 half-cycles), for example, this period might be about 1/120 of one second. Steps 558 through 564 are repeated as a loop until this time interval elapses, at which point the method continues to decision step 566.

At step 566, an inquiry is made as to whether a second visual image is to update. This second visual image is noted as the visual image that resides within the first cell and is projected to or otherwise shown at the second display surface of the reversible display device. Similar to the foregoing instances of the first and third visual images, if this second visual image is to be updated, then the method diverts to process step 568, where a new second visual image is communicated to the display device. After process step 568, or where the answer to the inquiry at decision step 566 is no, the method then continues to another decision step 570, where another inquiry is made as to whether multiple display cells are present. If the answer is yes at step 570, then the process continues to a subsequent decision step 572, where an inquiry is made as to whether a fourth visual image is to be updated. This fourth visual image is noted as the visual image that resides within the second cell and is projected to or otherwise shown at the second display surface of the reversible display device. If the fourth visual image is to be updated, then this is accomplished at process step 574. Either way, the process then reverts to process step 580, which is also where the method continues in the event that multiple display cells are not present within the reversible display device at step 570.

At process step 580, the second half-cycling process begins, where the visual image displayed at the first surface is discontinued, such that a visual image can be displayed at the second surface of the reversible display device. Accordingly, and similar to the first half-cycling process, the first virtual curtain is closed at process step 580, the first set of illumination components are deactivated at step 582, the second virtual curtain is opened at step 584, and the second set of illumination components are turned on or activated at step 586. At the following process step 588, the second visual image is then displayed at the first cell, which should result in the display of that second image at the second surface of the reversible display device. Again, further manipulation of this second visual image may then occur within or about the gaming machine before the end visual image is displayed or perceived at the gaming machine, as detailed through many possible techniques above.

The next decision step 590 involves another inquiry as to whether multiple cells are used, in which case the fourth visual image is displayed at the second cell at process step 592. Under either a single or double cell embodiment, the following decision step 594 involves another inquiry as to whether an appropriate time interval has elapsed. This second time interval can be the same or about the same length as the first time interval, or it may be different as desired by a given maker or operator. This second time interval represents the period of the half-cycle where the second (and possibly fourth) visual image is to be displayed at the second surface. In one embodiment, for example, this period might also be about 1/120 of one second. Steps 588 through 594 are then repeated as a loop until this second time interval elapses, at which point the method continues to final decision step 596. As noted above, this decision step inquires as to whether the display sequence or process is to continue. If not, the method ends at end step 599. If the display sequence is to continue, however, then the method goes to process step 598, where coordination of the first and second visual images can take place. Such a coordination step might also include some consideration of the third and fourth visual images, as appropriate.

This coordination step can involve synchronization of multiple images, which may be particularly appropriate where the end first and second visual image displays are ultimately side-by-side or otherwise adjacent and intended to display one or more coherent images, for example, as noted above. In addition, the coordination step might involve two different or identical views of the same game as shown to two different players or viewers. In such instances, it is preferable that the visual images shown on multiple displays be coordinated such that they make sense and do not present game situations or outcomes that are incongruent or problematic with respect to each other. In other examples, such as where coherent images that span multiple screens or displays are used, frame-to-frame coordination can be particularly important, such that disjointed or otherwise incoherent images are not created. In such instances, such coordination can preferably be accounted for by the MGC and/or one or more other specialized processors that are specifically adapted for distributing the various visual images in the first place. A wide variety of commercially available and proprietary software programs and hardware components can perform these and other coordinating functions in a variety of ways, and it is specifically contemplated that any and all such software and hardware elements can be used in implementing and operating the methods and devices of the present invention.

After this final connecting coordination step 598, the method then reverts to waypoint A 530, whereupon the entire display process is repeated. Of course, it will be readily appreciated that in the event of a machine shutdown or other ending of a display sequence and the overall process at step 596 and 599, that the method may be resumed at waypoint A 530 rather than at start step 500 back at FIG. 10. In other words, it may not be necessary or desirable to completely recreate an already existing reversible display device, gaming machine, gaming device or other component before practicing the invention again by resuming the process at step 530.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming device comprising:

a gaming controller;

a memory coupled with the gaming controller; and a display device communicatively coupled to the gaming controller, the display device including a first display surface and a second display surface;

the display device including a plurality of electronic curtains including a first electronic curtain and a second electronic curtain, wherein the first electronic curtain is operable to dynamically and selectively adjust a first transmissivity characteristic associated with the first electronic curtain, and wherein the second electronic curtain is operable to dynamically and selectively adjust a second transmissivity characteristic associated with the second electronic curtain;

the display device further including a display screen interposed between the first electronic curtain and the second electronic curtain, the display screen including a plurality of display pixels;

the display device being operable to display, using the plurality of display pixels, a first image at the first display surface, wherein the display of the first image at the first display surface includes facilitating passage of a portion of light representing the first image through the first electronic curtain;

the display device being further operable to display, using the plurality of display pixels, a second image at the second display surface, wherein the display of the second image at the second display surface includes facilitating passage of a portion of light representing the second image through the second electronic curtain;

the gaming device being operable to control a wager-based game played at the gaming device.

2. The gaming device of claim 1, wherein the first electronic curtain is operable to dynamically adjust the first transmissivity characteristic of the first electronic curtain to a first transmissivity state during a first time interval, wherein the first electronic curtain is operable to dynamically adjust the first transmissivity characteristic of the first electronic curtain to a second transmissivity state during a second time interval; and wherein the second electronic curtain is operable to dynamically adjust the second transmissivity characteristic of the second electronic curtain to a third transmissivity state during the first time interval, wherein the second electronic curtain is operable to dynamically adjust the second transmissivity characteristic of the second electronic curtain to a fourth transmissivity state during the second time interval.

3. The gaming device of claim 1, wherein the first electronic curtain is operable to dynamically adjust the first transmissivity characteristic of the first electronic curtain to a first transmissivity state during a first time interval, wherein the first electronic curtain is operable to dynamically adjust the first transmissivity characteristic of the first electronic curtain to a second transmissivity state during a second time interval, wherein the first transmissivity state corresponds to a substantially transparent transmissivity state, wherein the second transmissivity state corresponds to a substantially opaque transmissivity state; and wherein the second electronic curtain is operable to dynamically adjust the second transmissivity characteristic of the second electronic curtain to a third transmissivity state during the first time interval, wherein the second electronic curtain is operable to dynamically adjust the second transmissivity characteristic of the second electronic curtain to a fourth transmissivity state during the second time interval, wherein the fourth transmissivity state corresponds to a substantially transparent transmissivity state, and wherein the third transmissivity state corresponds to a substantially opaque transmissivity state.

4. The gaming device of claim 1, wherein the display device is operable to display, using the plurality of display pixels, the first image at the first display surface during a first time interval, wherein the display of the first image at the first display surface includes facilitating passage of a portion of light representing the first image through the first electronic curtain;

wherein the display device is further operable to display, using the plurality of display pixels, the second image at the second display surface during a second time interval, wherein the display of the second image at the second display surface includes facilitating passage of a portion of light representing the second image through the second electronic curtain;

wherein the display device is further operable to prevent display of the first image at the second display surface during the first time interval; and wherein the display device is further operable to prevent display of the second image at the first display surface during the second time interval.

5. The gaming device of claim 1, wherein the display device is operable to display, using the plurality of display pixels, the first image at the first display surface during the first time interval, wherein the display of the first image at the first display surface includes facilitating passage of a portion of light representing the first image through the first electronic curtain by dynamically adjusting transmissivity of the first electronic curtain to a substantially transparent state of transmissivity during the first time interval;

wherein the display device is operable to display, using the plurality of display pixels, the second image at the second display surface during the second time interval, wherein the display of the second image at the second display surface includes facilitating passage of a portion of light representing the second image through the second electronic curtain by dynamically adjusting transmissivity of the second electronic curtain to a substantially transparent state of transmissivity during the second time interval;

wherein the display device is further operable to prevent display of the first image at the second display surface during the first time interval by dynamically adjusting transmissivity of the second electronic curtain to a substantially opaque state of transmissivity during the first time interval; and wherein the display device is further operable to prevent display of the second image at the first display surface during the second time interval by dynamically adjusting transmissivity of the first electronic curtain to a substantially opaque state of transmissivity during the second time interval.

6. The gaming device of claim 1, further comprising an optical device configured to redirect at least one of the first and second images to prevent the redirected image from being viewed directly from the second display surface.

7. The gaming device of claim 1, wherein the display screen comprises a self-illuminating display screen operable to generate visible light.

8. The gaming device of claim 1, wherein the display screen comprises an electroluminescence (EL) display screen or a light emitting diode (LED) display screen.

9. The gaming device of claim 1, further comprising a light source configured to emit light, wherein the light source is other than the display screen.

10. The gaming device of claim 1, further comprising:

an optical device configured to redirect at least one of the first and second images to prevent the redirected image from being viewed directly from the display screen;

wherein the optical device includes a lens, a mirror, or a lens and a mirror.

11. The gaming device of claim 1, wherein the display device is further operable to display the first image at the first display surface, and is further operable to display the second image at the second display surface in a manner such that the first image and second images may be simultaneously observed by at least one human observer.

12. The gaming device of claim 1, wherein the display device is further operable to display the first image at the first display surface, and is further operable to display the second image at the second display surface in a manner such that the first image and second images may be simultaneously observed by a same person.

13. The gaming device of claim 1, wherein the first image is displayed adjacent to the second image to create a coherent image that spans at least a portion of the first and second images.

14. The gaming device of claim 1, wherein the second display surface is located opposite to the first display surface.

15. A method for displaying images at a gaming device of a gaming network, the gaming device including a gaming controller, memory, and a display device communicatively coupled to the gaming controller, the display device including a first display surface and a second display surface, the display device including a first electronic curtain and a second electronic curtain, the display device further including a display screen interposed between the first electronic curtain and the second electronic curtain, the display screen including a plurality of display pixels, the method comprising:

generating a first image at the display screen using the plurality of display pixels;

generating a second image at the display screen using the plurality of display pixels;

dynamically and selectively adjusting a first transmissivity characteristic associated with the first electronic curtain;

dynamically and selectively adjusting a second transmissivity characteristic associated with the second electronic curtain;

displaying, using the plurality of display pixels, the first image at the first display surface of the display device, wherein the displaying of the first image at the first display surface includes facilitating passage of a portion of light representing the first image through the first electronic curtain;

displaying, using the plurality of display pixels, the second image at the second display surface of the display device, wherein the displaying of the second image at the second display surface includes facilitating passage of a portion of light representing the second image through the second electronic curtain; and controlling a wager-based game played at the gaming device.

16. The method of claim 15, further comprising:

dynamically adjusting the first transmissivity characteristic of the first electronic curtain to a first transmissivity state during a first time interval;

dynamically adjusting the first transmissivity characteristic of the first electronic curtain to a second transmissivity state during a second time interval;

dynamically adjusting the second transmissivity characteristic of the second electronic curtain to a third transmissivity state during the first time interval; and dynamically adjusting the second transmissivity characteristic of the second electronic curtain to a fourth transmissivity state during the second time interval.

17. The method of claim 15, further comprising:

dynamically adjusting the first transmissivity characteristic of the first electronic curtain to a first transmissivity state during a first time interval;

dynamically adjusting the first transmissivity characteristic of the first electronic curtain to a second transmissivity state during a second time interval, wherein the first transmissivity state corresponds to a substantially transparent transmissivity state, wherein the second transmissivity state corresponds to a substantially opaque transmissivity state;

dynamically adjusting the second transmissivity characteristic of the second electronic curtain to a third transmissivity state during the first time interval; and dynamically adjusting the second transmissivity characteristic of the second electronic curtain to a fourth transmissivity state during the second time interval, wherein the fourth transmissivity state corresponds to a substantially transparent transmissivity state, and wherein the third transmissivity state corresponds to a substantially opaque transmissivity state.

18. The method of claim 15, further comprising:

displaying, using the plurality of display pixels, the first image at the first display surface during a first time interval, wherein the displaying of the first image at the first display surface includes facilitating passage of a portion of light representing the first image through the first electronic curtain;

displaying, using the plurality of display pixels, the second image at the second display surface during a second time interval, wherein the displaying of the second image at the second display surface includes facilitating passage of a portion of light representing the second image through the second electronic curtain;

preventing display of the first image at the second display surface during the first time interval by dynamically adjusting transmissivity of the second electronic curtain to a substantially opaque state of transmissivity during the first time interval; and preventing display of the second image at the first display surface during the second time interval by dynamically adjusting transmissivity of the first electronic curtain to a substantially opaque state of transmissivity during the second time interval.

19. The method of claim 15, further comprising:

displaying the first image at the first display surface and displaying the second image at the second display surface in a manner such that the first image and second images may be simultaneously observed by at least one human observer.

20. The method of claim 15, further comprising:

preventing light from passing through the first electronic curtain by closing the first electronic curtain;

facilitating light to pass through the second electronic curtain by opening the second electronic curtain; and displaying the second image for a time interval from the second display surface of the display device while the first electronic curtain is closed and the second electronic curtain is open.

21. The method of claim 15, further comprising displaying the first image at the first display surface and displaying the second image at the second display surface in a manner such that the first image and second images are simultaneously observed by at least one human observer.

22. The method of claim 15, further comprising displaying the first image at the first display surface and displaying the second image at the second display surface in a manner such that the first image and second images are simultaneously observed by a same human observer.

23. The method of claim 15, wherein the gaming device includes an optical device, the method further comprising:

redirecting the first or second image by using the optical device; and preventing the redirected image from being viewed directly from the display device by redirecting the first or second image.

24. The method of claim 23, wherein the optical device includes a parabolic mirror, the method further comprising enlarging the redirected image by using the parabolic mirror.

25. The method of claim 23, further comprising facilitating the first and second images to be simultaneously viewable by the same viewer by said arranging the optical device.

26. A gaming device comprising:

a gaming controller;

a memory coupled with the gaming controller; and a display device communicatively coupled to the gaming controller, the display device including a first display surface and a second display surface;

the display device including a plurality of electronic curtains including a first electronic curtain and a second electronic curtain, wherein a first adjustable transmissivity characteristic is associated with the first electronic curtain and a second adjustable transmissivity characteristic is associated with the second electronic curtain;

the display device further including a display screen interposed between the first electronic curtain and the second electronic curtain, the display screen including a plurality of display pixels;

means for generating a first image at the display screen using the plurality of display pixels;

means for generating a second image at the display screen using the plurality of display pixels;

means for dynamically and selectively adjusting the first transmissivity characteristic associated with the first electronic curtain;

means for dynamically and selectively adjusting the second transmissivity characteristic associated with the second electronic curtain;

means for displaying, using the plurality of display pixels, the first image at the first display surface of the display device, wherein the displaying of the first image at the first display surface includes facilitating passage of a portion of light representing the first image through the first electronic curtain;

means for displaying, using the plurality of display pixels, the second image at the second display surface of the display device, wherein the displaying of the second image at the second display surface includes facilitating passage of a portion of light representing the second image through the second electronic curtain;

means for controlling a wager-based game played at the gaming device;

means for displaying the first image at the first display surface and displaying the second image at the second display surface in a manner such that the first image and second images are simultaneously observed by a same human observer.

* * * * *